JOSEPH L. AMMONS
FLOYD H. MORROW
INVENTORS

BY
*Wayland D. Keith*
THEIR AGENT

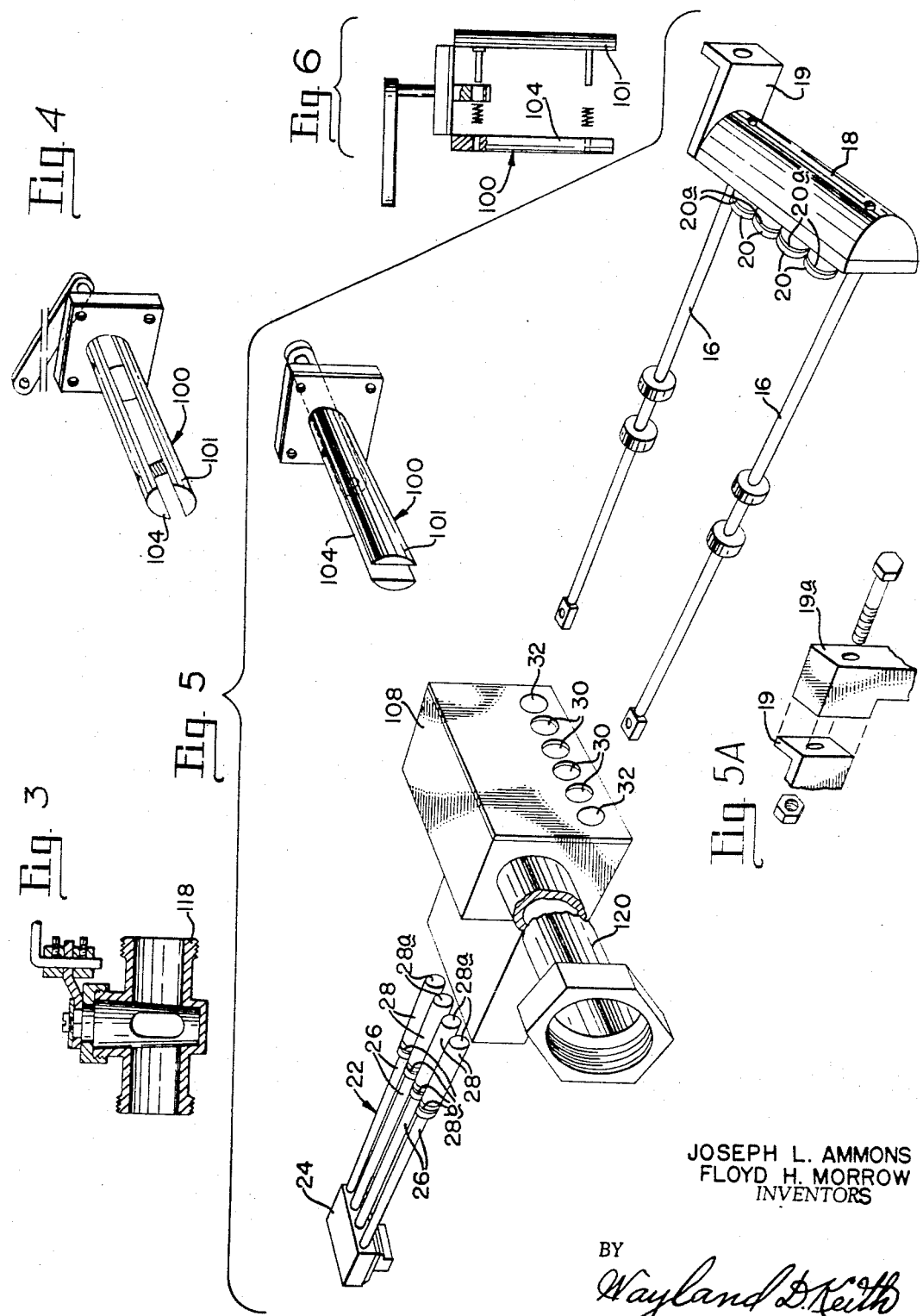

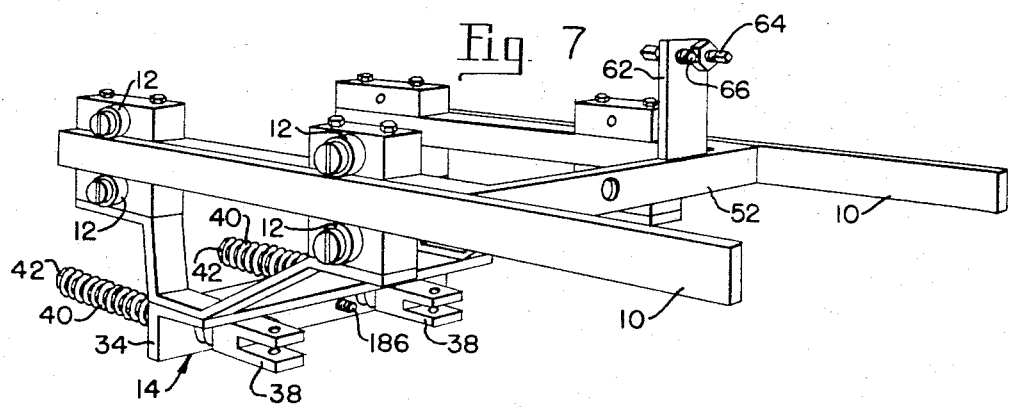
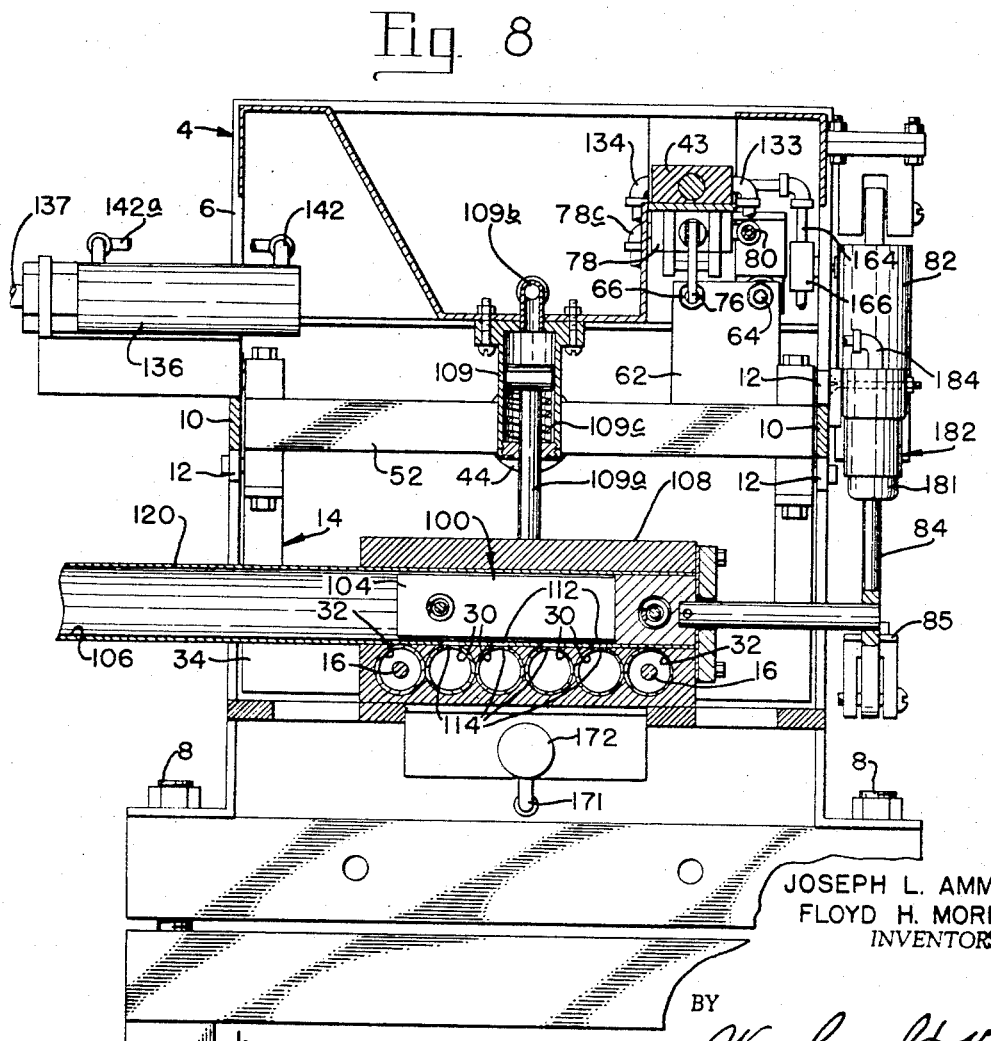

Fig. 9

JOSEPH L. AMMONS
FLOYD H. MORROW
INVENTORS

BY

Wayland D. Keith
THEIR AGENT

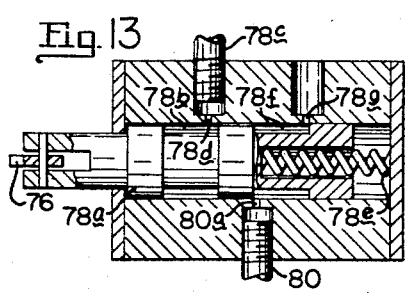
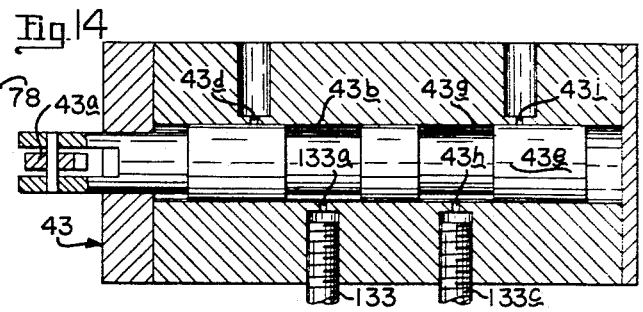
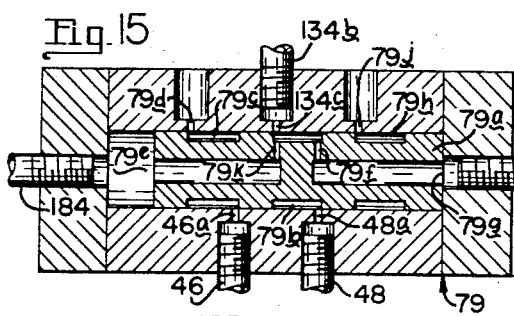
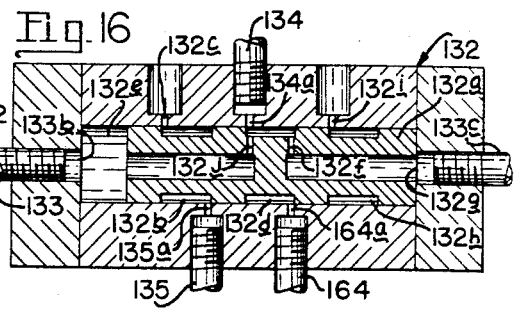
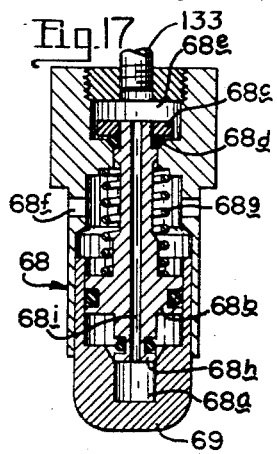
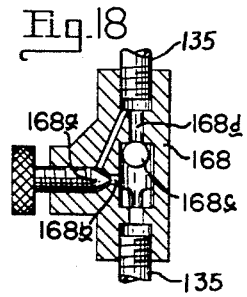
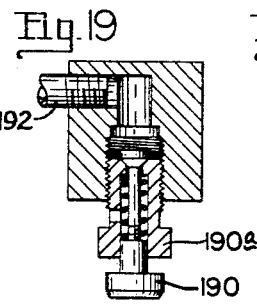
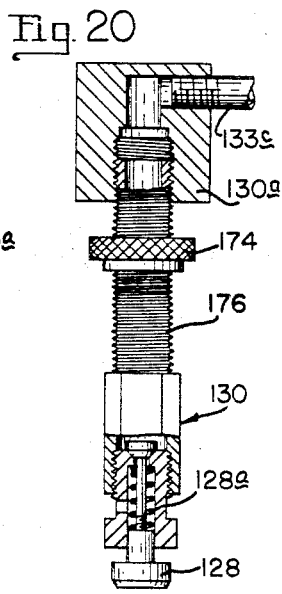
JOSEPH L. AMMONS
FLOYD H. MORROW
*INVENTOR.*
BY Wayland D. Keith
THEIR AGENT

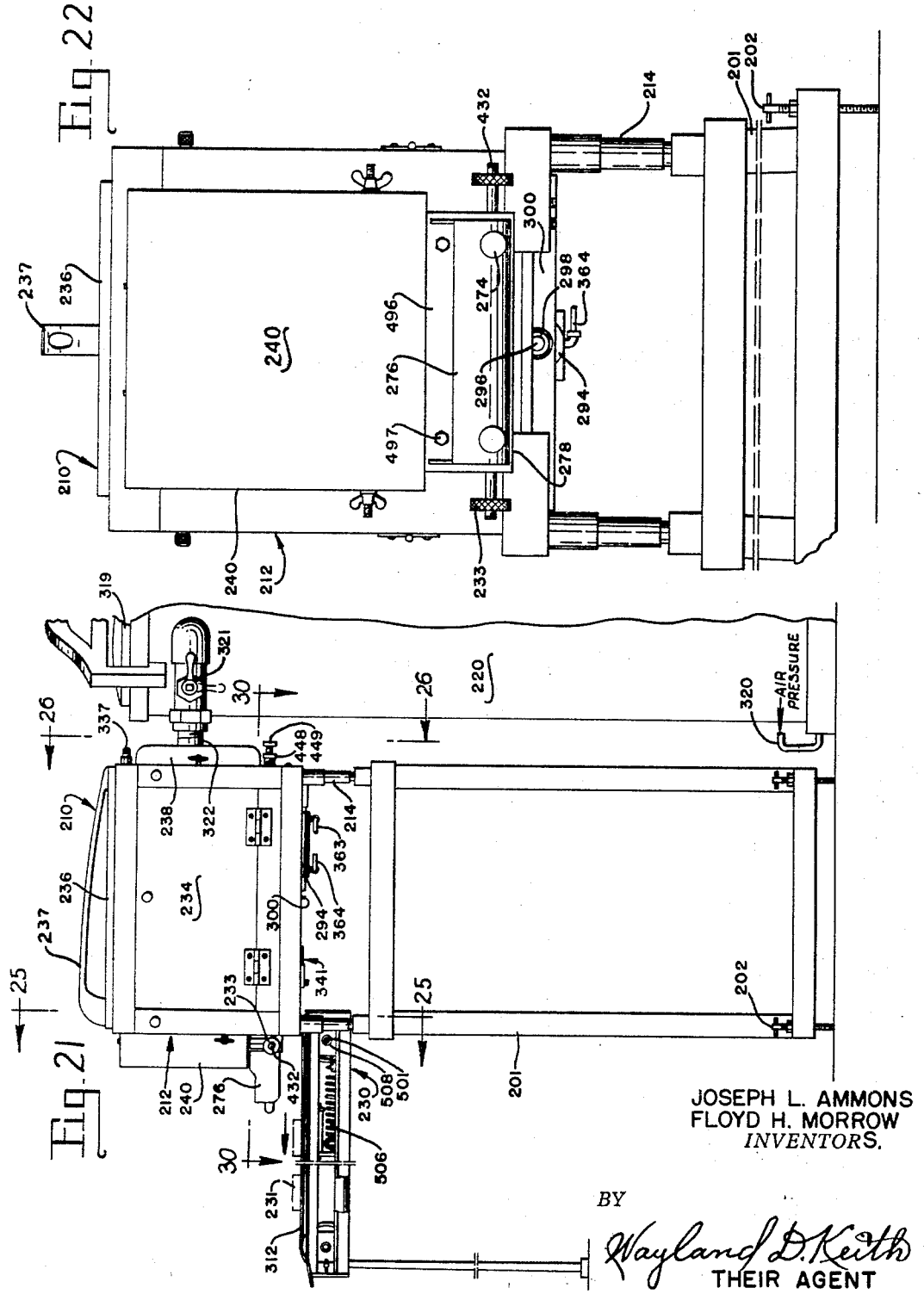

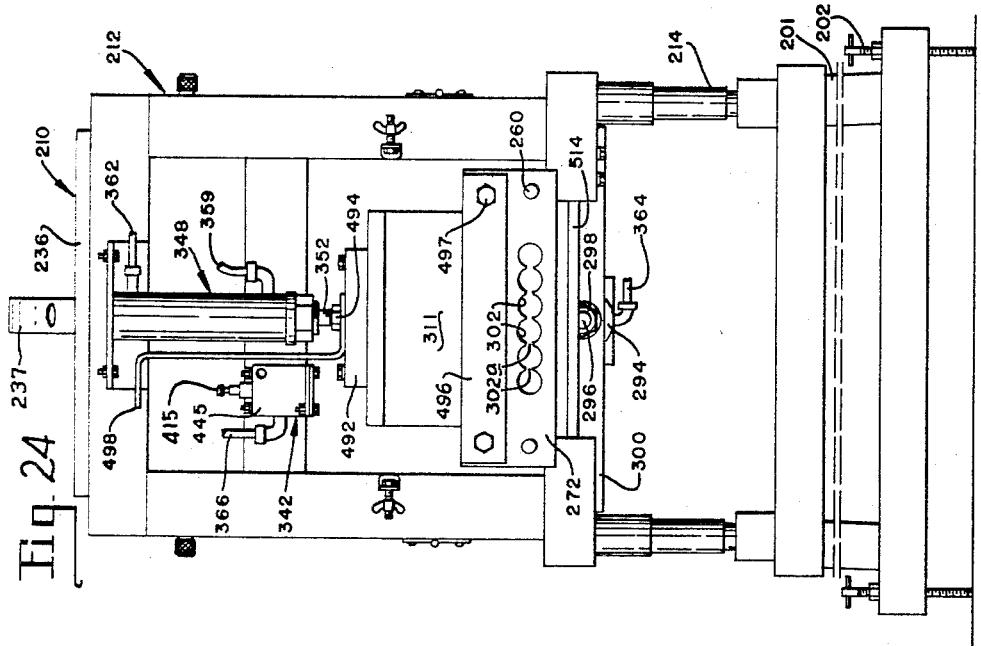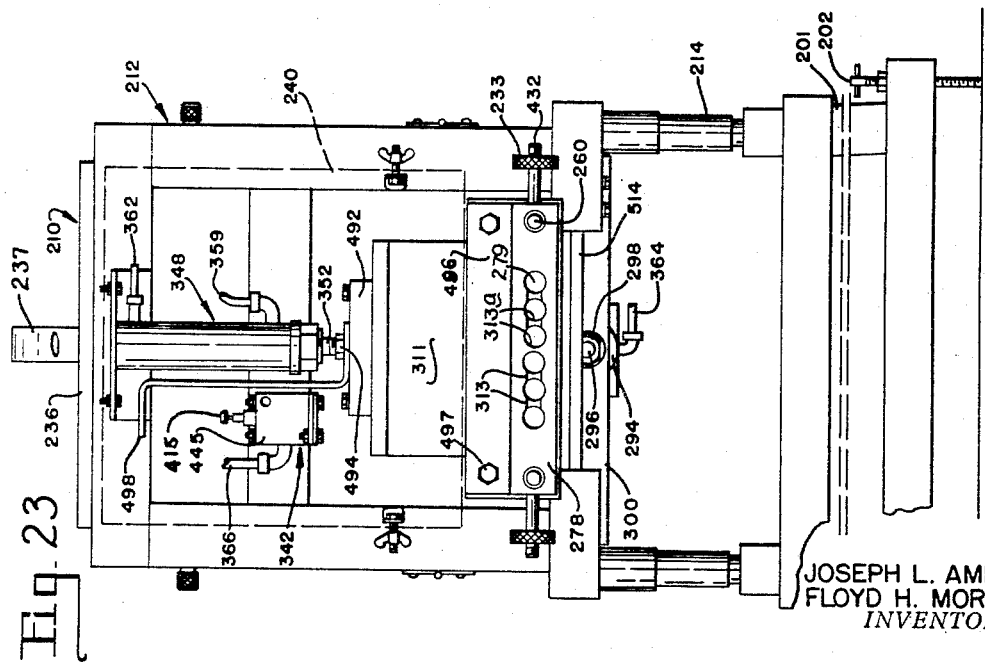

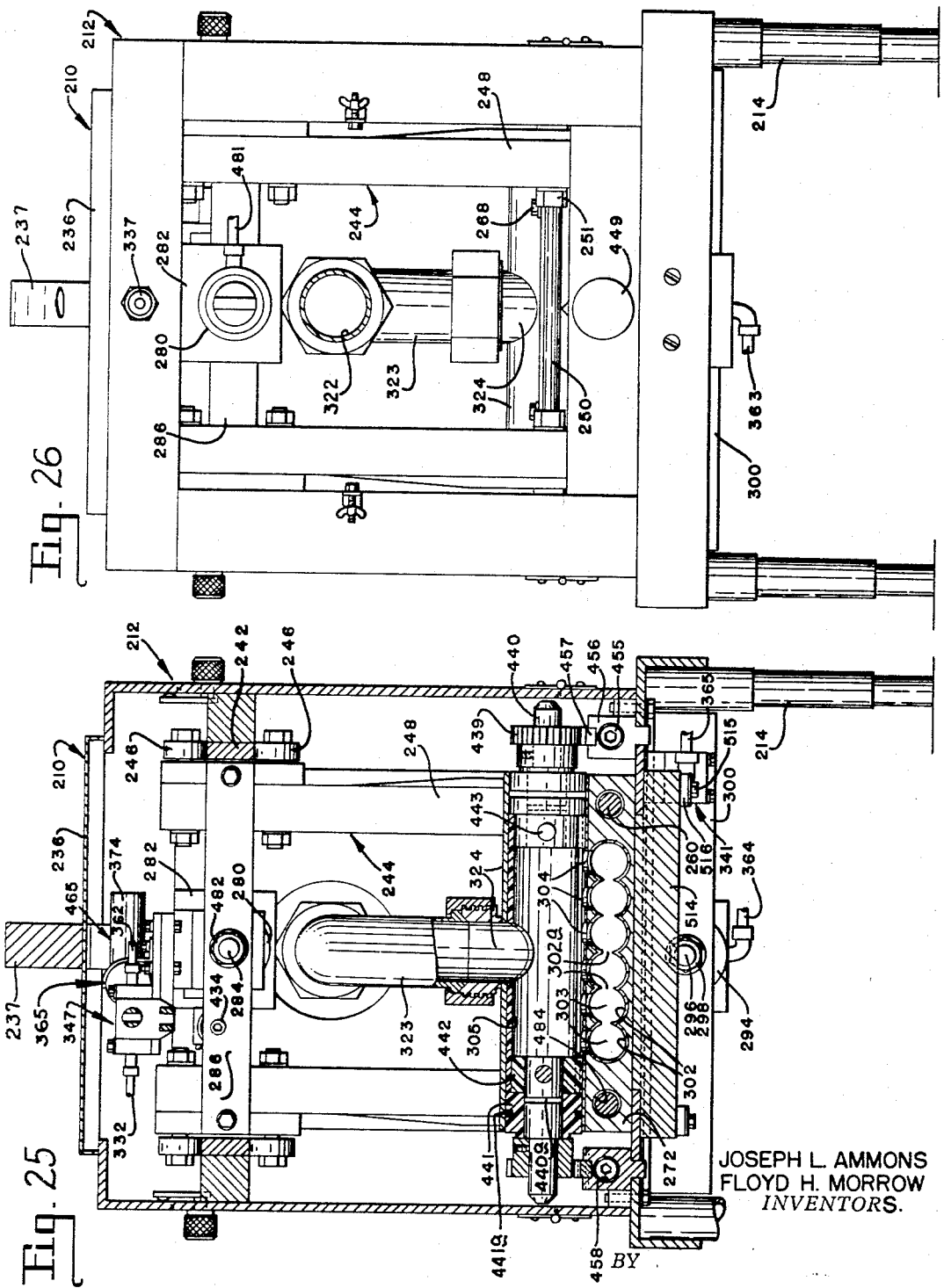

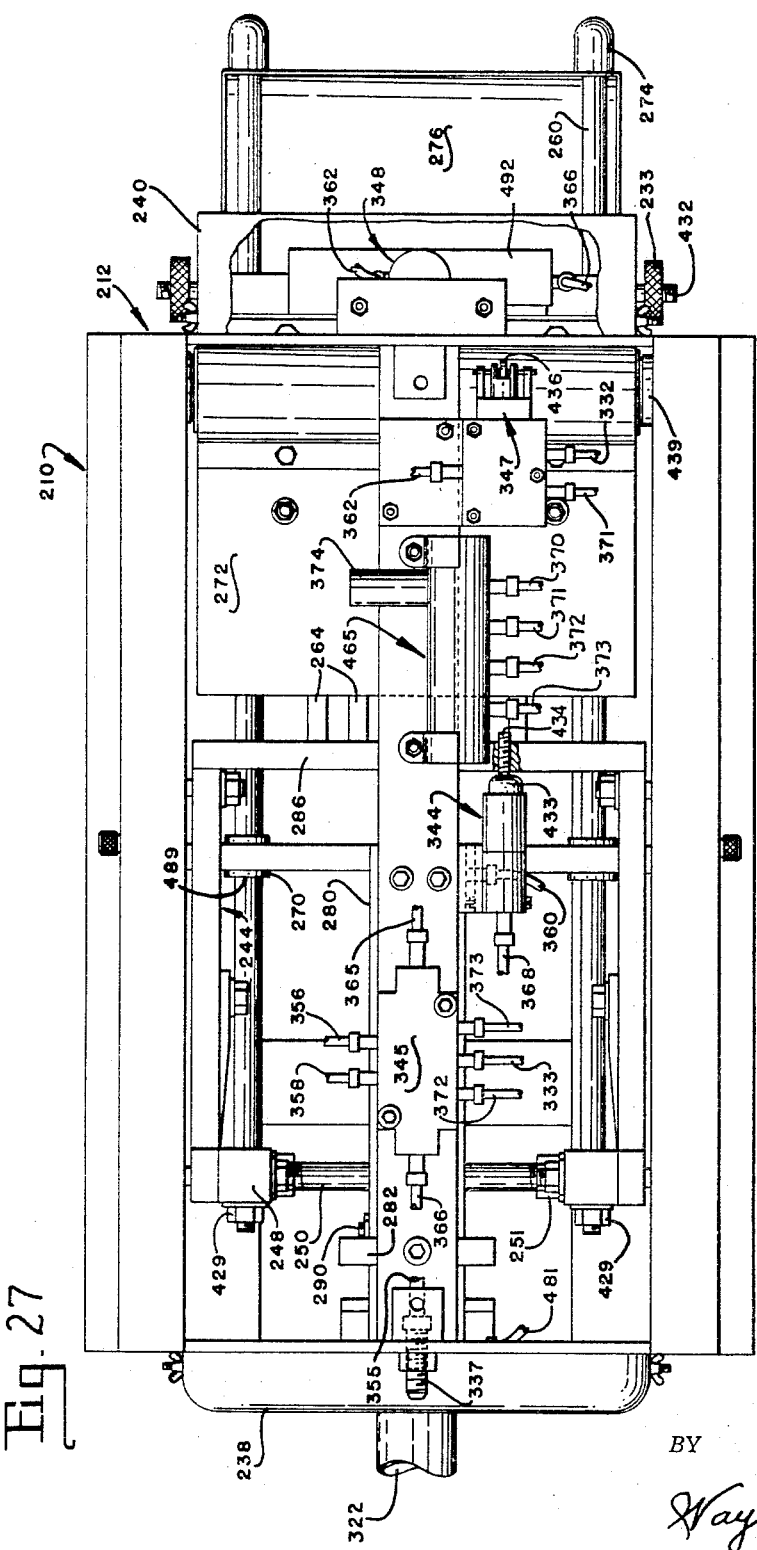

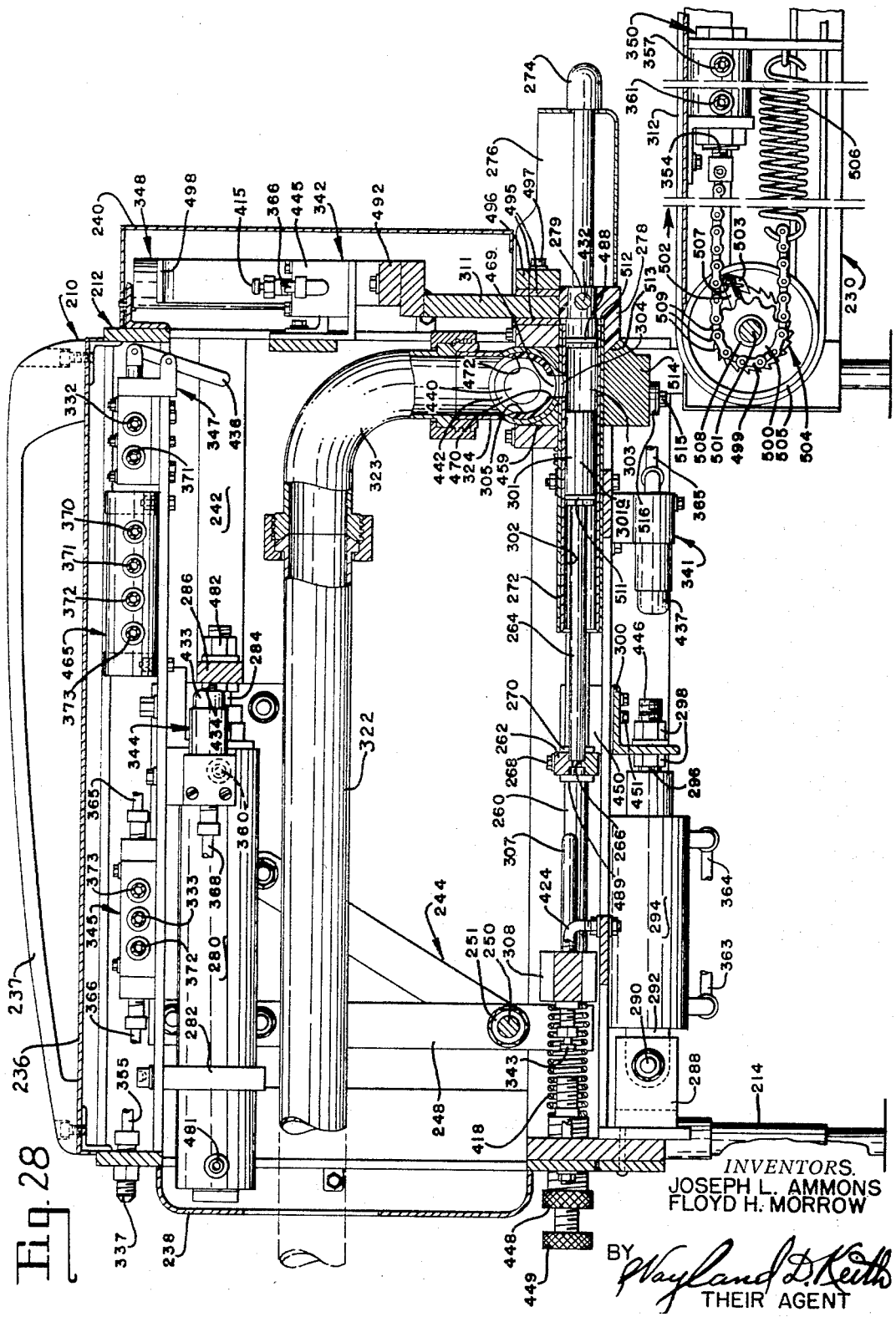

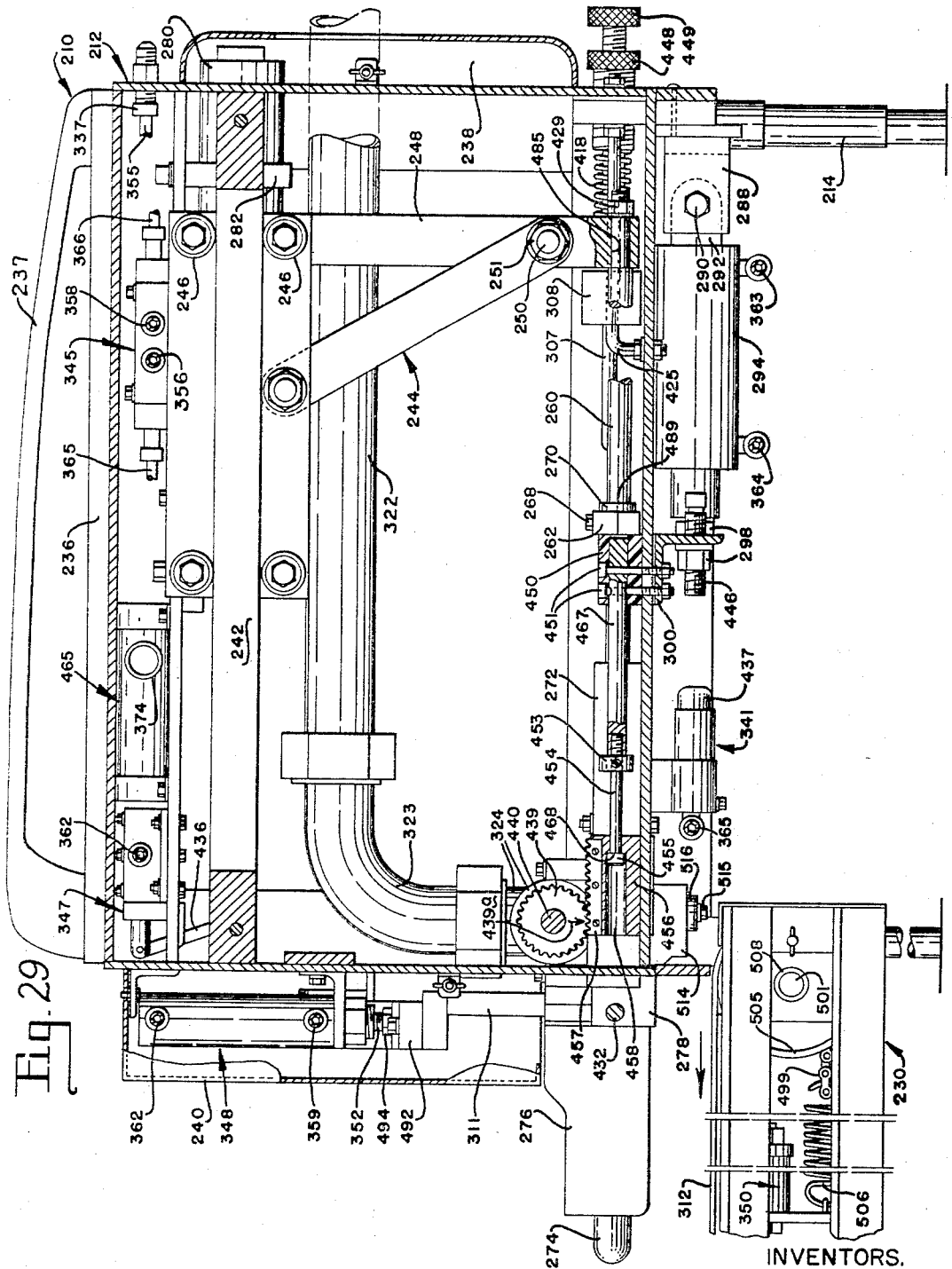

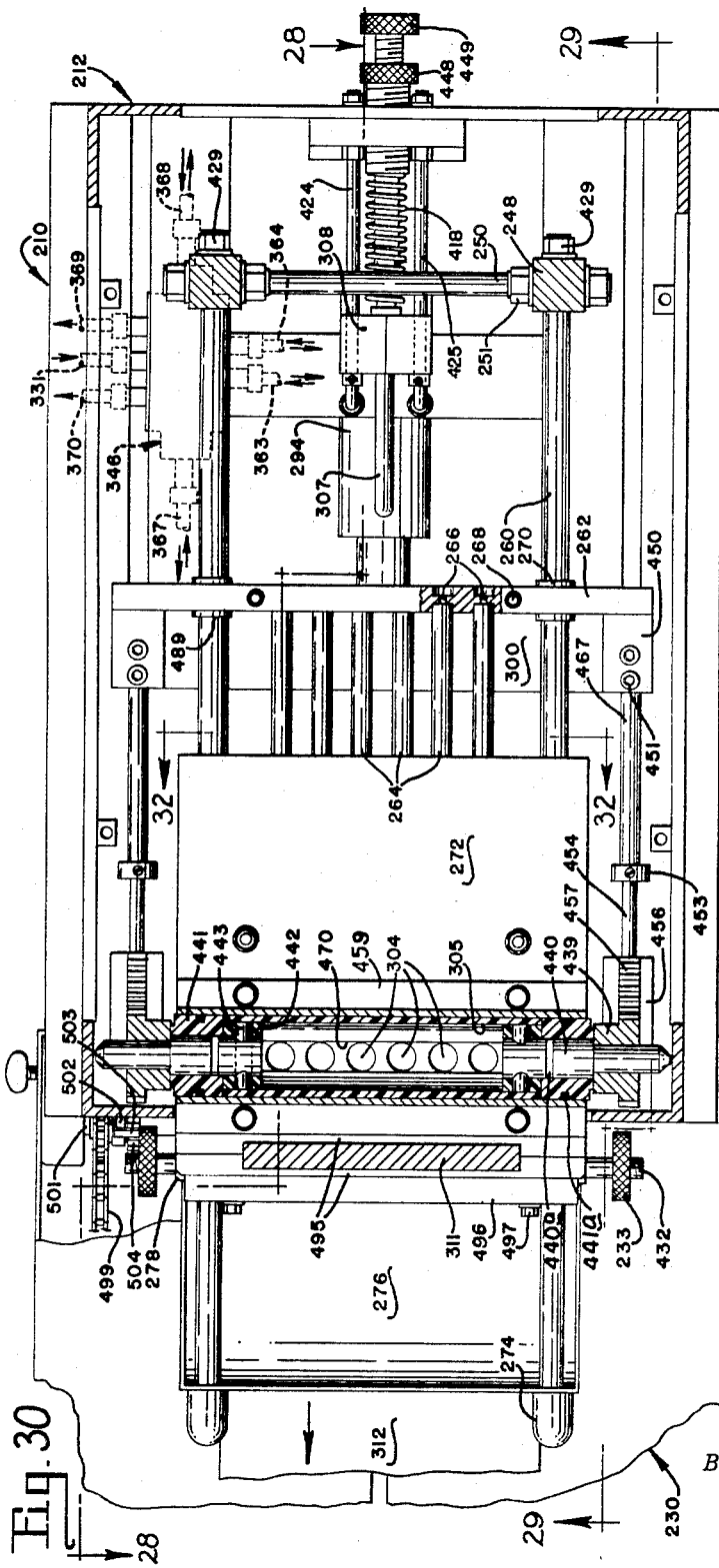
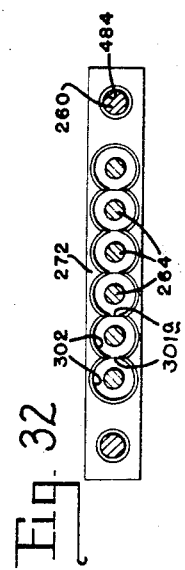
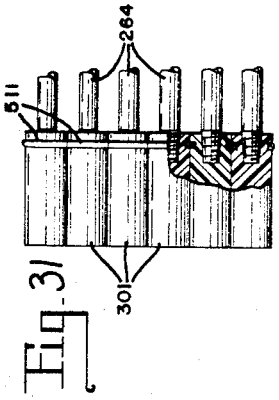
Jan. 14, 1969  J. L. AMMONS ET AL  3,421,178
PNEUMATICALLY ACTUATED, AUTOMATIC SKINLESS
SAUSAGE MOLDING MACHINE
Filed Nov. 29, 1966  Sheet 16 of 20
JOSEPH L. AMMONS
FLOYD H. MORROW
INVENTORS.
BY
*Wayland D. Keith*
THEIR AGENT

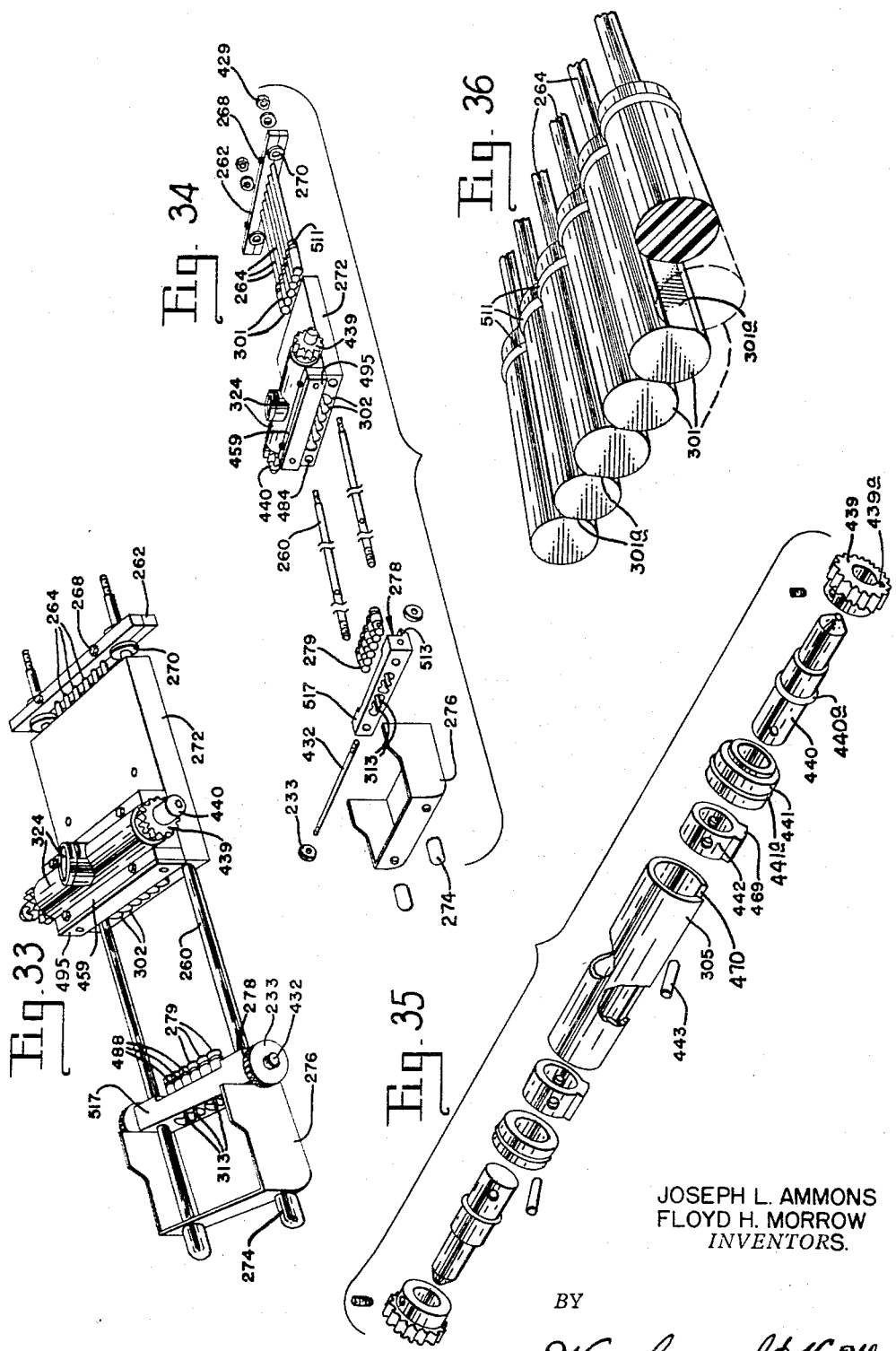

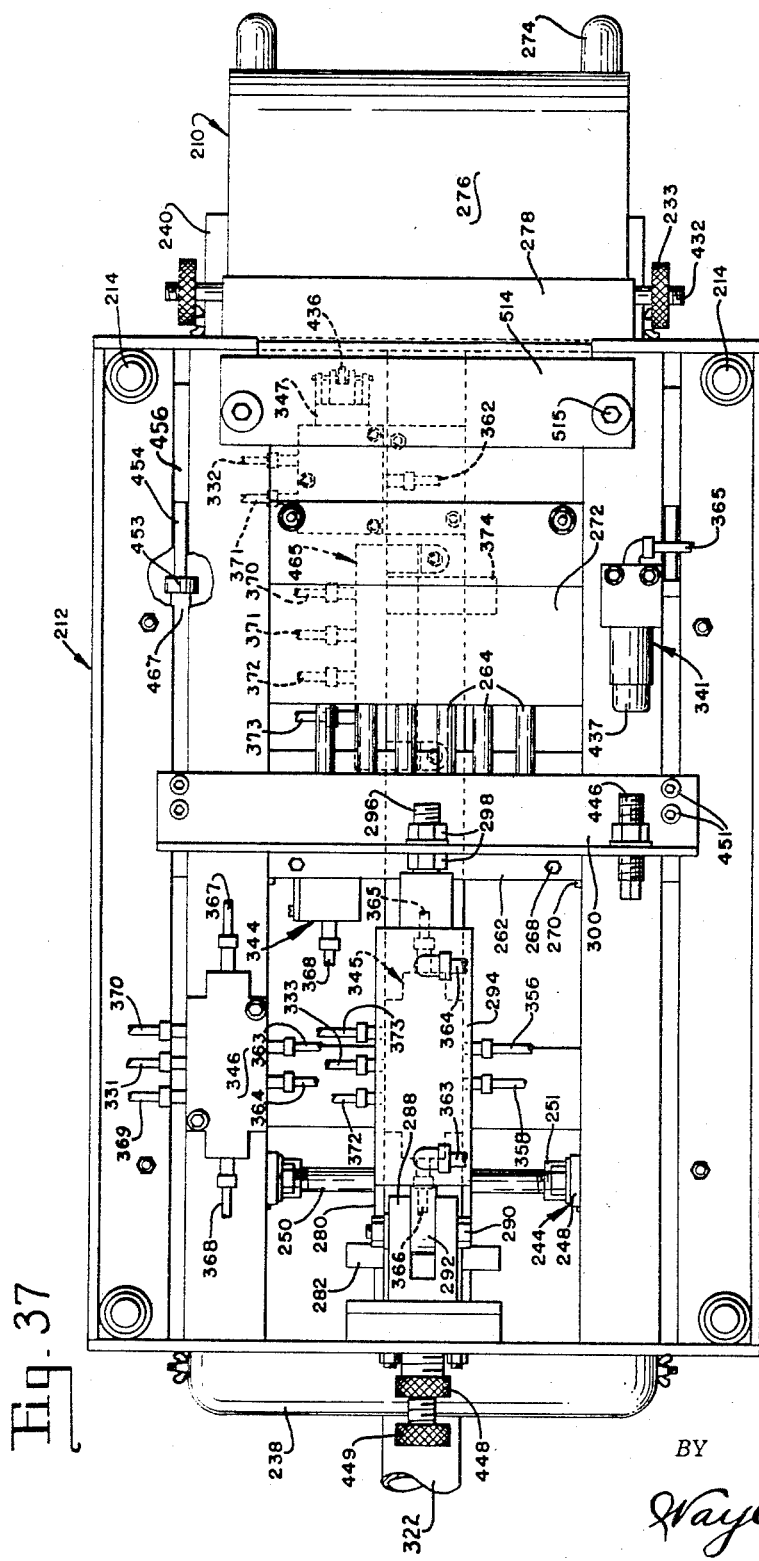

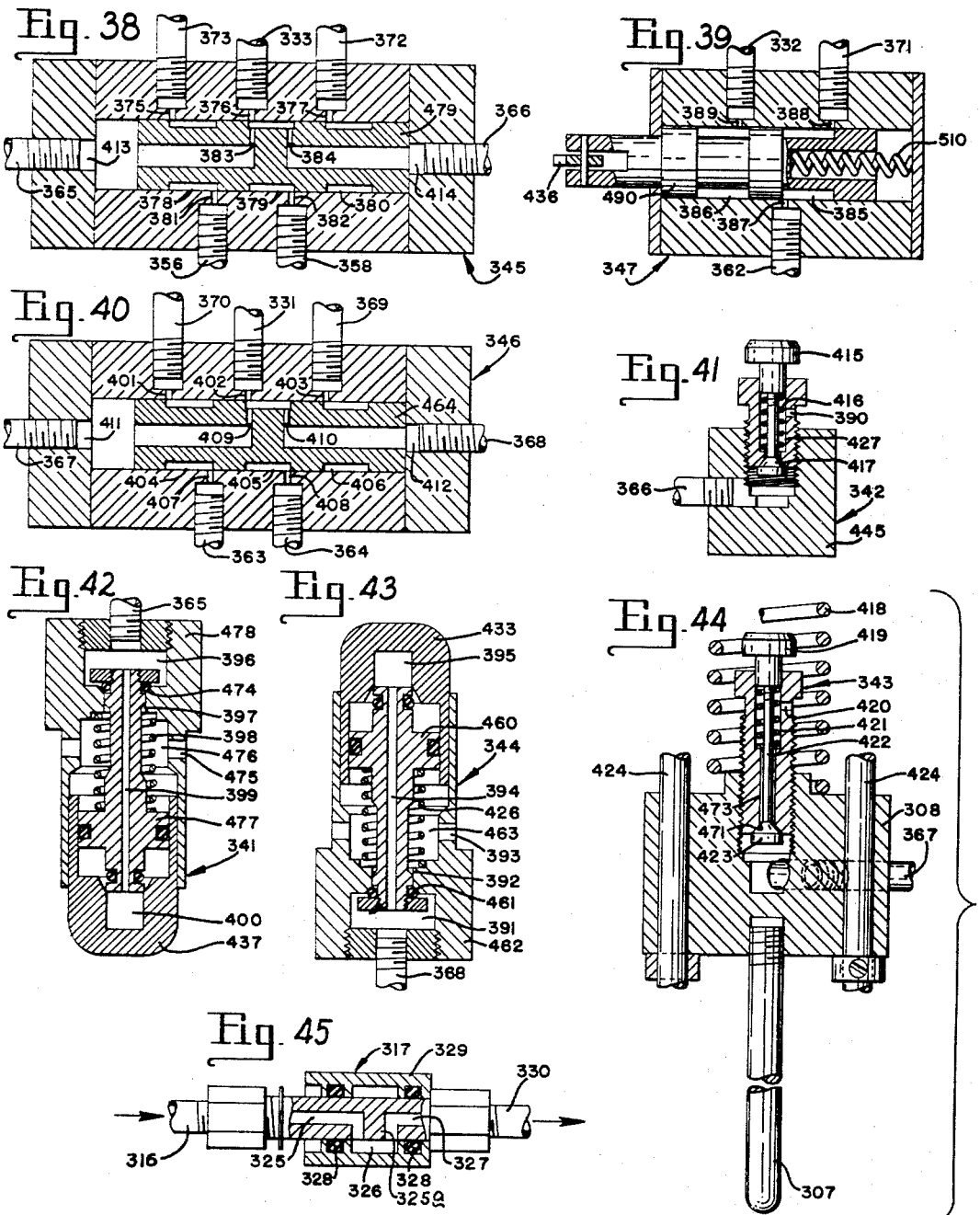

JOSEPH L. AMMONS
FLOYD H. MORROW
INVENTORS.

BY
Wayland D. Keith
THEIR AGENT

United States Patent Office 3,421,178
Patented Jan. 14, 1969

3,421,178
PNEUMATICALLY ACTUATED, AUTOMATIC
SKINLESS SAUSAGE MOLDING MACHINE
Joseph L. Ammons, 1617 Lawson Lane 79106, and
Floyd H. Morrow, P.O. Box 5884 79107, both of
Amarillo, Tex.
Continuation-in-part of application Ser. No. 440,571,
Mar. 17, 1965. This application Nov. 29, 1966, Ser.
No. 597,652
U.S. Cl. 17—32                     34 Claims
Int. Cl. A22c 7/00; A22c 11/00

ABSTRACT OF THE DISCLOSURE

An air actuated machine for molding sausage material into skinless sausages, in a continuous cycle. The plurality of sausages being molded may be joined, if desired, in adjacent, side-by-side relation by thin longitudinal webs of fiber. The sausage may be selectively dispensed on a pre-placed papering machine, and/or onto a conveyor. The machine is so timed that the sequential operations are automatic, once started, and some are simultaneous, but when the sausage pressure ceases, the machine stops, or if air is bled from the system, the machine stops. The machine may be reloaded with sausage material and/or air pressure may be reinstated, whereupon, the machine will start operating at the point of interruption, and the cycle will be completed and the succeeding cycles automatically resumed.

---

This application is a continuation-in-part of our application Ser. No. 440,571, filed Mar. 17, 1965, for Pneumatically Actuated Skinless Sausage Molding Machine, now Patent No. 3,319,286, issued May 16, 1967.

This invention relates to sausage molding machines and more particularly to sausage molding machines which mold skinless sausages in an elongated cylindrical form, and which sausage is of sufficient density to hold the form thereof after the sausage is ejected from the mold.

Various sausage molding machines have been proposed heretofore, but these, for the most part, required that the mechanism be driven by electric motors, and the like, which, of necessity had to be operated under conditions adverse to the operation of electric motors, such as being subject to change of temperature, moisture, and the presence of various animal matter, which made it difficult for the apparatus to produce cold, firm sausage.

In the present device most of the mechanical functions are performed by fluid actuated mechanisms such as air actuated cylinders and plungers.

The present machine is so constructed that sausage may be fed thereinto from a source of sausage supply through a stuffer valve and ejected into a multiplicity of molds so that the weight, density, and length may be controlled, within specified limits. When the machine is once set in operation, it is fully automatic and will mold sausages of the same size, weight, and density so long as sausage material is fed into the machine.

An object of this invention is to provide an improved mechanism for molding skinless sausages and the like, the weight, density, and length of which may be fully controlled to specified limitations.

Another object of the invention is to provide a sausage forming machine that is actuated by fluid power and will operate under adverse conditions in cold, moist refrigeration vaults.

Still another object of the invention is to provide a machine that may be manually operated or may be fully automatic.

Another object of this machine is to provide a sausage molding machine which will mold a multiplicity of skinless sausages and deliver these onto a sheet of paper so they may be directed onto a conveyor and boxed automatically.

Another object of the invention is to provide an automatic stuffer control valve which will admit only the required amount of sausage into the molds of the molding machine to give sausage of the correct weight, density and length.

Still another object of the invention is to provide an adjustable sausage compression control mechanism.

Still another object of the invention is to provide an adjustable weight control mechanism.

Another object of the invention is to provide a two cycle air circuit to insure positive operation each time the sausage stuffer valve directs sausage or the like into the molds.

Still another object of the invention is to provide a valving mechanism which stops both the mechanism and the flow of the sausage into the machine simultaneously.

A further object of the invention is to provide a sausage molding machine which provides an internal feeding mechanism into the mold cylinders to prevent leakage of sausage material during the molding cycle.

Yet another object of the invention is to provide an internal feed molding apparatus which permits expansion of sausage in the mold, after the final stage of compression.

A still further object of the invention is to provide a speed control for the actuating mechanism of the sausage molding machine which will enable the selective variation of the speed of the mechanism.

Yet a further object of the invention is to provide a removable mold cylinder block, which is secured in place by fluid pressure while the machine is operating.

A still further object of the invention is to provide a sausage molding machine which does not require manual lubrication.

Another object of the invention is to provide a machine that is relatively simple in construction, easy to assemble and disassemble for cleaning and repair, and is not readily damaged by moisture being directed thereinto.

Still a further object of the invention is to provide a rapid movement cutting mechanism to cut the ejected sausages away from the face of the ejecting pistons so rapidly as to prevent the sausages sticking to the cutting blade.

Another object of this invention is to provide a completely air actuated, continuous cycle operating molding machine which is simple in design, having a minimum of parts for long operating capacity and low maintenance.

A still another object of this invention is to provide a sausage molding machine which may be readily maintained in sanitary condition and wherein, all of the parts directly connected with the passage of the sausage material can be completely disassembled and thoroughly sterilized between each operation of the machine.

A further object of this machine is to provide a cleaning mechanism which will remove any excess sausage accumulated during the molding process and deposit it in a receptacle for reuse.

A still further object of this invention is a molding device which will allow the molded sausages to be discharged so that the sausage adheres together as ejected sausages can be placed directly into a package as a unitary group without having individual sausage to be manually moved together in side by side relation.

A still further object of the invention is to mold sausage so that each individual sausage of the group of sausage is molded through the passage of sausage material through individual orifices, into the mold cavities that the fibers from one sausage of the group is not interconnected by transverse fibers with adjacent sausages, with the adherence of adjacent sausages being so slight that they can be easily broken away, one from the other by the consumer.

Still another object of this invention is to provide an independent compression control arrangement which will result in each sausage being finished will be of a substantially, identical, predetermined weight.

A still further object of this invention is to provide an independent length control arrangement which will control the length of each ejected sausage to be substantially, identical in length.

A further object of this invention is to provide an air driven conveyor belt which will operate, intermittently, in timed relation with the discharge of the ejected sausages, and which will maintain the conveyor belt against movement at the time the sausages are ejected from the machine and which will move the belt and sausage after the initiation of the next molding cycle.

A further object of this invention is to provide a conveyor with a construction that will allow it to be used either independently of, or in conjunction with the sausage papering mechanism which is shown in the above mentioned co-pending with this application.

A further object of this invention is to provide a simple speed control mechanism by which the operator can vary the speed of the molding cycle of the sausage.

A further object of the invention is to provide a sausage molding mechanism which does not need to be externally lubricated and which can be throughly cleaned by steam or water without damage to the mechanism.

With these objects in view and others which will become manifest as the description proceeds, reference is to be had to the accompanying drawings in which like reference characters designate like parts in the several views thereof, in which:

FIG. 3 is an enlarged, longitudinal, sectional view with parts shown in elevation of the air cylinder operated stuffer valve and showing a portion of a linkage connected thereto;

FIG. 4 is a perspective view of a segmental valve for directing sausage material into the mold cylinders;

FIG. 5 is an exploded view of the cylinder and piston assembly, showing the valve in position to direct sausage material into the molding cylinders;

FIG. 5A is a fragmentary exploded, perspective view of the paper machine mounting bracket on the papering machine and the complementary bracket on the sausage molding machine;

FIG. 6 is an exploded view of the segmental valve for directing sausage material into the sausage molding cylinders;

FIG. 7 is a perspective view of the movable carriage and track members, the carriage of which actuates the pistons within the molding cylinders;

FIG. 8 is a sectional view taken on the line 8—8 of FIG. 2, looking in the direction indicated by the arrows;

FIG. 9 is a front elevational view of the molding machine, showing the molding machine connected to the stuffer valve for directing sausage material into the sausage molding machine, and showing a "papering machine" mounted thereon;

FIG. 13 is a longitudinal, sectional view through the cutter control valve;

FIG. 14 is a longitudinal, sectional view through the start and stop valve, with the slidable valve member therein being shown in elevation;

FIG. 15 is a longitudinal, sectional view through the reversing valve for the main ejector cylinder;

FIG. 16 is a longitudinal, sectional view through the reversing valve for the oscillating valve cylinder, the stuffer valve cylinder, and for the piston retractor cylinder;

FIG. 17 is a longitudinal, sectional view through a button type re-cyling valve;

FIG. 18 is a longitudinal, sectional view through a flow and check valve;

FIG. 19 is a longitudinal, sectional view through a button bleeder valve;

FIG. 20 is a longitudinal view through a button bleeder valve similar to that shown in FIG. 19, except a tubular extension is shown thereon, and with an adjustment nut shown thereon in full outline, other portions of the valve being shown in full outline;

Figure 1:
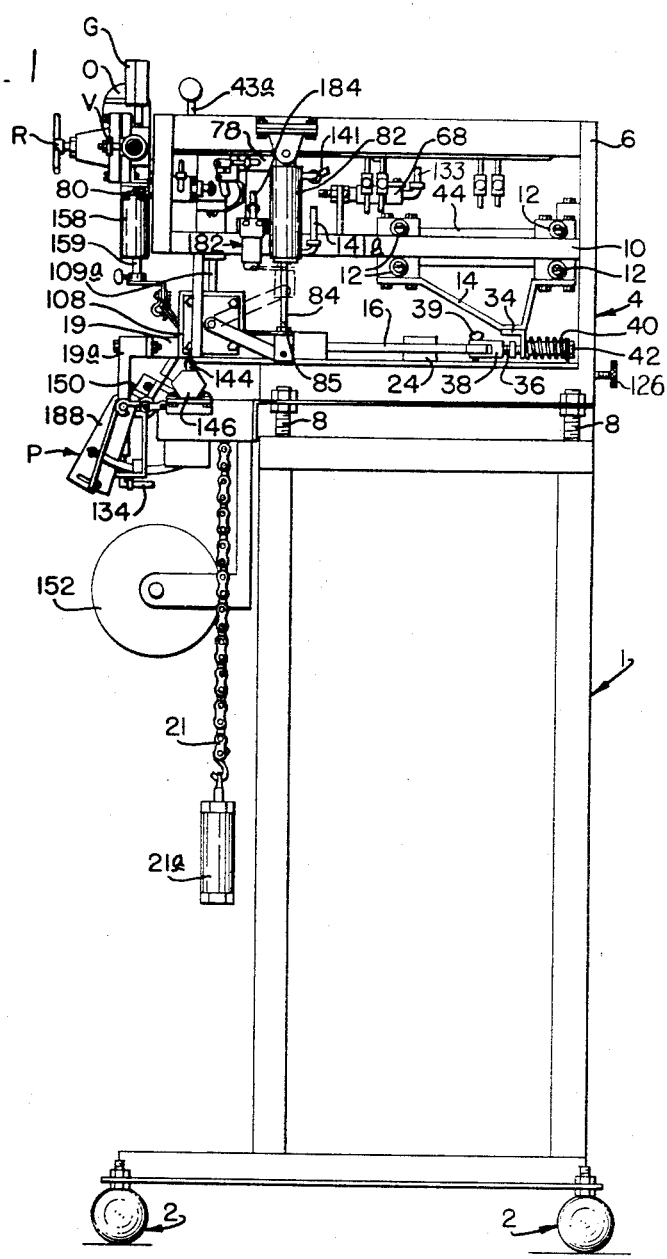
FIG. 1 is a side elevational view of the completed skinless sausage molding machine.
Figure 46:
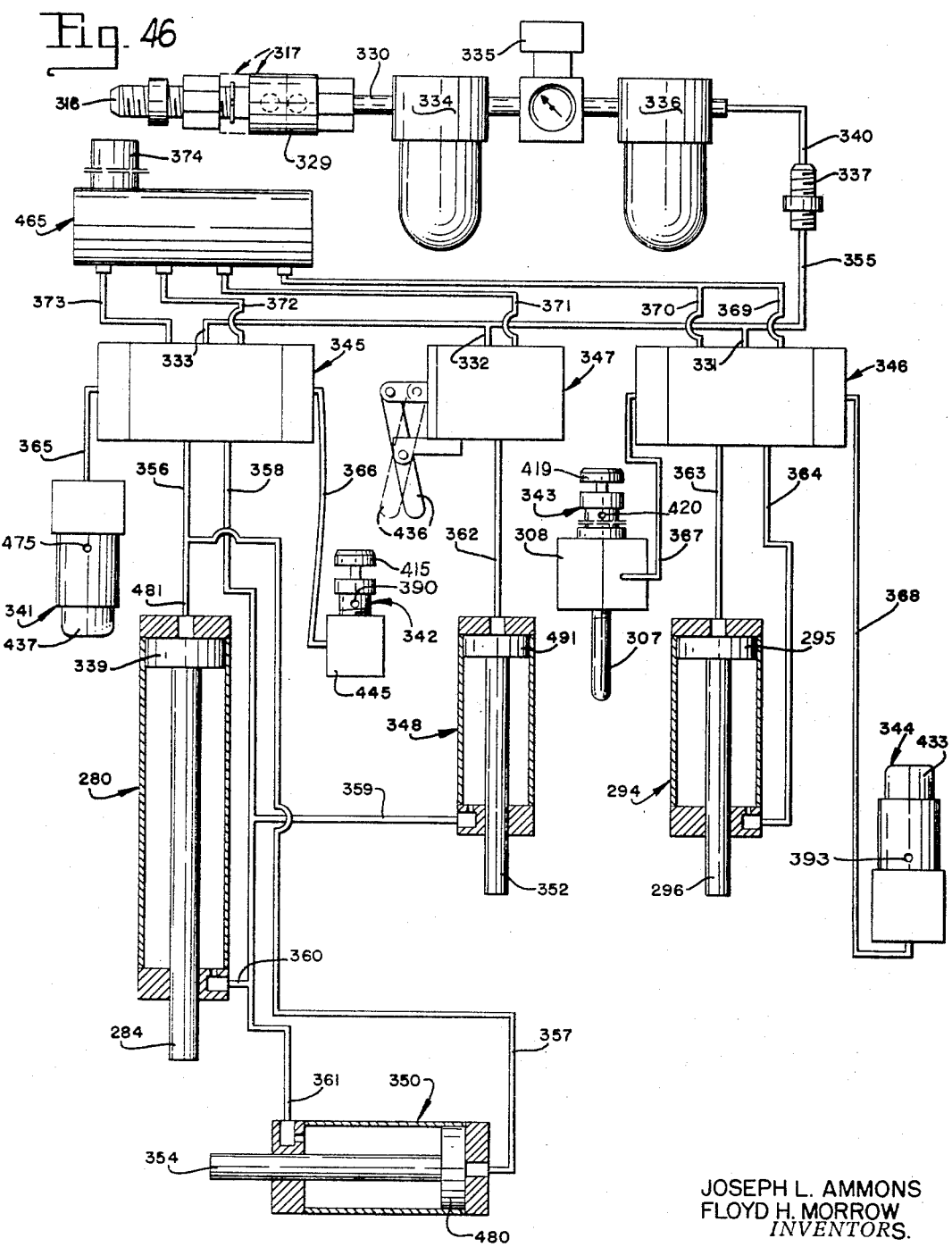

FIG. 21 is a side elevational view of an alternate form of an air actuated, automatic, skinless sausage molding machine, and showing a support frame therefor, showing a fragmentary portion of a sausage stuffer connected thereto, with a sausage stuffer control valve being shown in full outline in one position, with the control valve handle shown in dashed outline in another position; a conveyor is shown as associated with the sausage molding machine, with parts broken away and shortened, with ejected sausages being shown in dashed outline on the conveyor;

FIG. 22 is an enlarged, front elevational view of the alternate form of automatic, skinless sausage molding machine, shown mounted on an upright support frame, with portions of the frame being broken away and shortened, with the sausage molding machine being shown apart from the conveyor and the sausage stuffer;

FIG. 23 is a view similar to FIG. 22, but with the front end cover member being shown in dashed outline, the residue pan being removed from the molding machine, to show the interior construction thereof, and showing a block in which pistons are mounted to form closures for the ends of the mold cylinders;

FIG. 24 is a view similar to FIG. 23, but showing the block and the cylinder closure members, and the parts associated therewith being removed from the molding machine;

FIG. 25 is a further enlarged sectional view of the molding machine, apart from the upright support frame, taken approximately on the section line 25—25, as indicated on FIG. 21, looking in the direction indicated by the arrows;

FIG. 26 is a sectional view taken on the line 26—26 of FIG. 21, looking in the direction indicated by the arrows, on the same scale as FIG. 25, with the rear cover plate removed from the molding machine to show the interior details of construction;

FIG. 27 is a top plan view of the molding machine, on substantially the same scale as FIGS. 25 and 26, the top cover, having the handle thereon, removed, and with a portion of the front cover being broken away, to bring out the interior details of construction;

FIG. 28 is a longitudinal, sectional view taken approximately on the line 28—28 of FIG. 30 looking in the direction indicated by the arrows, showing portions thereof broken away and in section at other points to more clearly bring out the details of construction, and with portions shown in dashed outline to show the relation of certain parts of the machine with other parts thereof, and further showing a fragmentary, elevational portion of a conveyer mechanism associated therewith, parts of which conveyer mechanism are broken away and shortened so as to show the view on a scale substantially as shown in FIGS. 25 through 27;

FIG. 29 is a view similar to FIG. 28, on substantially the same scale thereof, but taken substantially on a section line 29—29 of FIG. 30, looking in the direction indicated;

FIG. 30 is a longitudinal, horizontal, sectional view taken substantially on a line 30—30 of FIG. 21, looking in the direction indicated by the arrows, with the side cover members and the end cover members removed therefrom to bring out the mechanical details of construction;

FIG. 31 is an enlarged fragmentary top plan view of the pistons shown apart from the mold cylinders, showing fragmentary portion of a connecting rod attached to each piston, and showing a fragmentary portion of the plurality of pistons broken away and in section to bring out the details of construction;

FIG. 32 is a sectional view taken on line 32—32 of FIG. 30, looking in the direction indicated by the arrows, to bring out the details of construction, with the scale thereof being on the same scale as FIG. 30;

FIG. 33 is a perspective view of the cylinder block, piston rods, transverse piston rod retainer block, arcuately movable sausage inlet valve, valve and valve actuating mechanisms, closure members for the cylinders of the cylinder block, closure member mounting block, residue pan, and closure member actuating rods;

FIG. 34 is an exploded, perspective view of the assembly shown in FIG. 33 without the sausage inlet being valve exploded, with the parts being shown on a slightly smaller scale than FIG. 33;

FIG. 35 is an enlarged exploded view of the movable elements within the sausage inlet valve;

FIG. 36 is an enlarged perspective view of the pistons and fragmentary portion of the piston rods shown apart from the cylinder block, showing one of the pistons broken away and in sectional, and a portion thereof in dashed outline to show the interfitting relation of the flattened portions with an adjacent piston;

FIG. 37 is a bottom plan view of the molding machine shown apart from the sausage stuffer and conveyer, with portions broken away and with portions shown in dotted outline to bring out the details of construction;

FIG. 38 is a longitudinal, sectional view of a reversing valve for the main cylinder;

FIG. 39 is a longitudinal, sectional view through a three-way valve which actuates the cutter cylinder;

FIG. 40 is a valve similar to the valve shown in FIG. 38 but for the retraction of the pistons in the mold cylinders; and to operate the arcuately movable sausage valve;

FIG. 41 is a longitudinal, sectional view through a button type bleeder valve associated with the reversing valve for the main button, bleeder type cylinder;

FIG. 42 is a button bleeder type reversing valve, which valve is associated with recycling type valve to advance the piston in the main cylinder;

FIG. 43 is a longitudinal, sectional view through a button, bleeder type recycling valve to actuate a reversing valve to actuate the piston within the cylinder piston retractor;

FIG. 44 is a sectional view partly in elevation, and with parts broken away, of the bleeder valve and block assembly to actuate a reversing valve connnected to the piston retractor cylinder;

FIG. 45 is a fragmentary portion of the air supply conduit, and showing a slide type air control valve for stopping and starting the various pneumatically actuated valve and cylinders, and the mechanism on the alternate form of sausage molding machine; and FIG. 46 is a diagrammatic view, with portions shown in section and with portions shown in dashed outline, and with certain parts broken away and shortened to show the details of construction of the pneumatic piping and valving system of the alternate form of the sausage molding machine as shown in FIGS. 21 through 45, the alternate position of certain valves being shown in dashed outline.

With more detailed reference to the drawings, the numeral 1 designates generally a main frame having adjustable support members 2 secured to the lower side thereof for seating on a conventional floor or on such work space upon which it is desired to seat the machine for operation. The numeral 4 designates generally the operating mechanism which comprises a frame 6 which is secured to main frame 1 by adjustable bolt members 8.

The frame 6 has spaced apart trackways 10 mounted longitudinally on the sides of frame 6 to receive rollers 12, which rollers are journaled on carriage 14, as will best be seen in FIGS. 1 and 7, which rollers roll along trackways 10 in guided relation.

The carriage 14 connects with pusher rod assembly 16, which pusher rod assembly has a head 18 thereon which carries plugs 20 which close the outer ends of the sausage mold cylinders 30, in cylinder block 108.

A piston assembly, designated generally by the numeral 22, is mounted on a block 24, with the piston rods 26 each carrying a piston 28 thereon, which respective pistons are in a position to pass into mold cylinders 30 to form the compressing unit for the skinless sausages, as will be brought out more fully hereinafter. Each pusher rod 16 passes through one of the cylinders 32 in cylinder block 108 on each side of the molding cylinders 30. The carriage 14 extends downwardly and has a transverse bar 34 thereacross which has spaced apart apertures therein to receive a pair of threaded rods 36, each of which has a clevis 38 on the forward end thereof. On the opposite side of the transverse bar 34 on each rod, there is a compression spring 40, the tension of each compression spring 40 is regulated by a nut 42.

The pusher rods 16 are each apertured to enable coupling of the rods to each clevis 38 by pin 39, so upon movement of the carriage 14, the pusher rods 16 will move in unison therewith, except under certain conditions, whereupon the springs 40 will be compressed.

The sausage molding machine is operated by fluid pressure, preferably by air pressure, and has an air compressor (not shown) withdrawing air from the atmosphere and directing the air into air supply line 134 and through valve V through a pressure regulator R, which regulator regulates the output of pressure, as will be indicated on gauge G. Air is directed through an oiler O in the manner well understood in the art of pneumatics for operating air control devices.

The present air system is of the restrictive or back pressure type. Upon opening a main air supply line control valve V, air pressure is directed from the source of supply, into and through main air supply line 134, through regulator R, through an oiler O to exert air pressure on gauge G, which main air supply line is connected to the various valves and actuating elements, as will be more fully brought out hereinafter.

The air is directed from the source of supply through oiler O, into the main air supply line 134 to reversing valve 132 which directs air to and from oscillating valve cylinder 82, stuffer valve cylinder 136, and piston retractor cylinder 172. The air is directed from the air supply line 134 into reversing valve 132, through port 134a, and with the spool valve member 132a in the position as shown in full outline in FIGS. 10 and 16, air is directed through an annular passage 132d out through port 164a into air line 164 through a flow and check valve 166, FIG. 10, which valve is the same construction as shown in FIG. 18, with the air flowing unimpeded into air lines 141a and 142a, which will move plungers 84 and 137 into retracted position within the oscillating valve cylinder 82 and stuffer valve cylinder 136, respectively, to close the oscillating valve 100 and stuffer valve 118 respectively, simultaneously.

Simultaneously with the retraction of plungers 84 and 137, air is applied, through main air supply line 134, to branch air line 109b which leads to clamp cylinder 109 which clamps cylinder block 108 in place, which clamp cylinder is a single acting cylinder, and which urges plunger 109a thereof outward to compress spring 109c, which plunger is moved into contact relation with cylinder block 108 to clamp the cylinder block in place, as will best be seen in FIGS. 1 and 8, which holds the cylinder block 108 in fixed relation with respect to the mechanism 4, until it is desired to cease operation of the machine for cleaning, inspection or repair.

Figure 2:
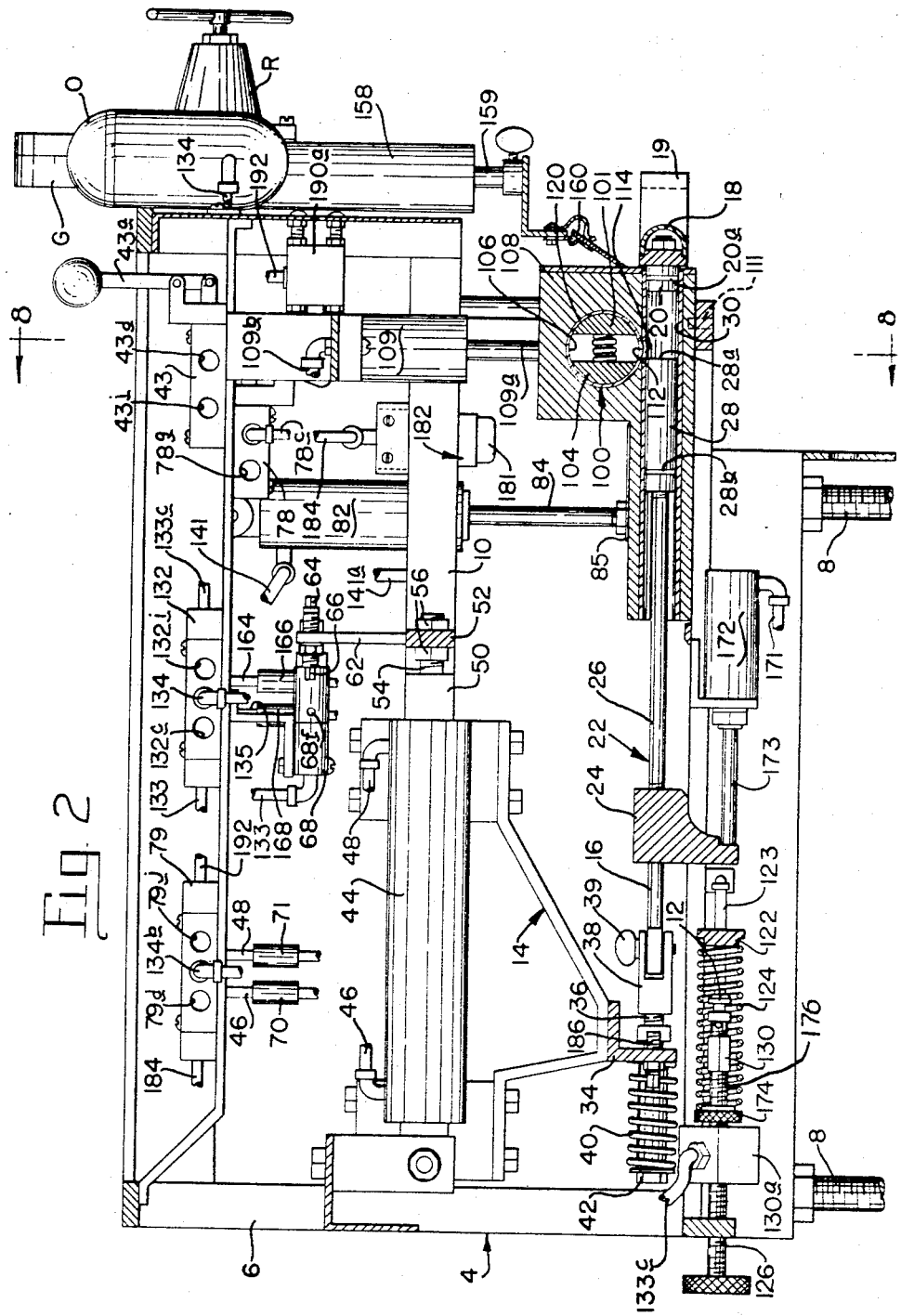
FIG. 2 is an enlarged longitudinal, sectional view through the operating mechanism of the machine taken approximately along the line 2—2 of FIG. 9, looking in the direction indicated by the arrows.
Figure 10:
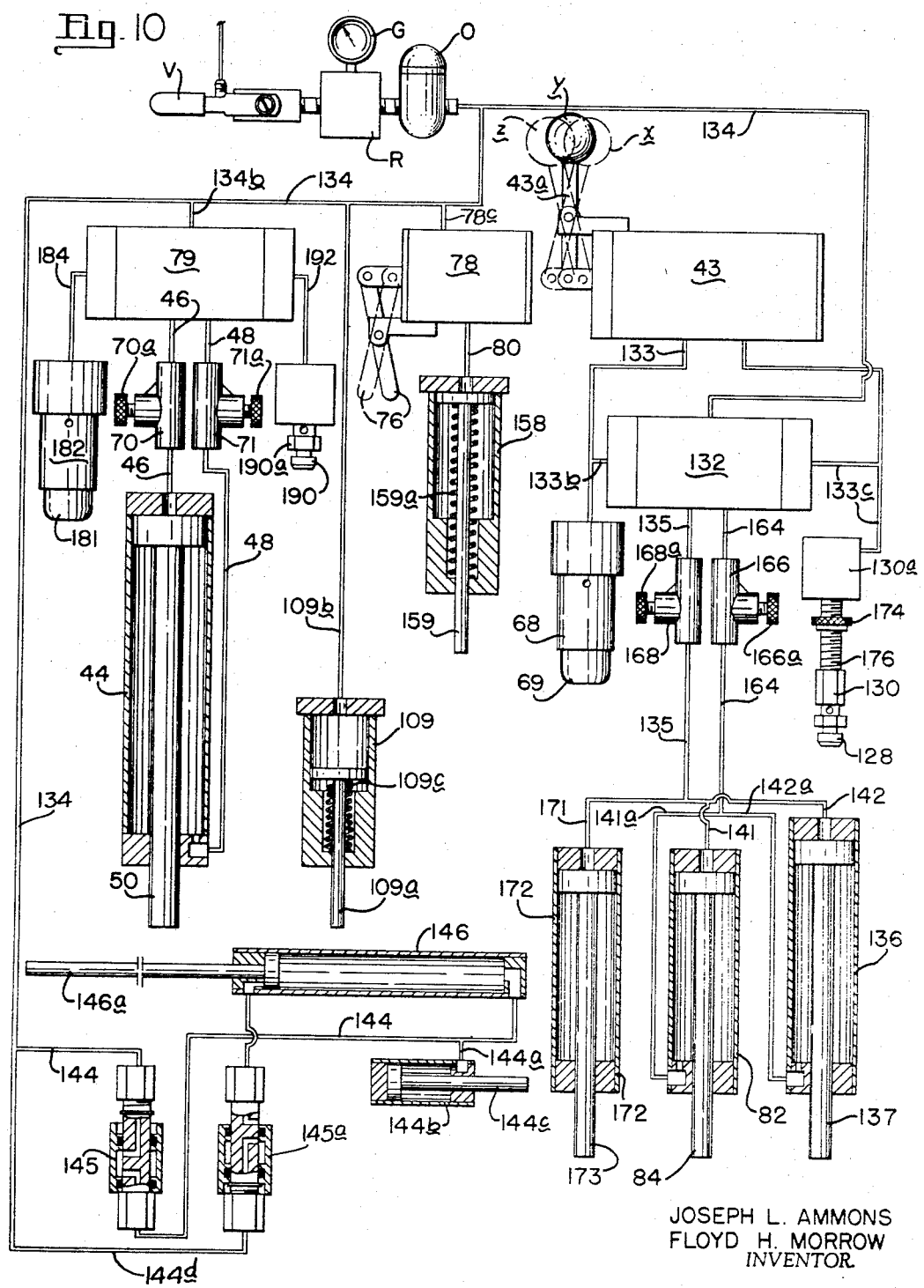
FIG. 10 is a diagrammatic view of the fluid system and cylinders with portions shown in section and with portions shown in dashed outline to show alternate positions.
Figure 11:
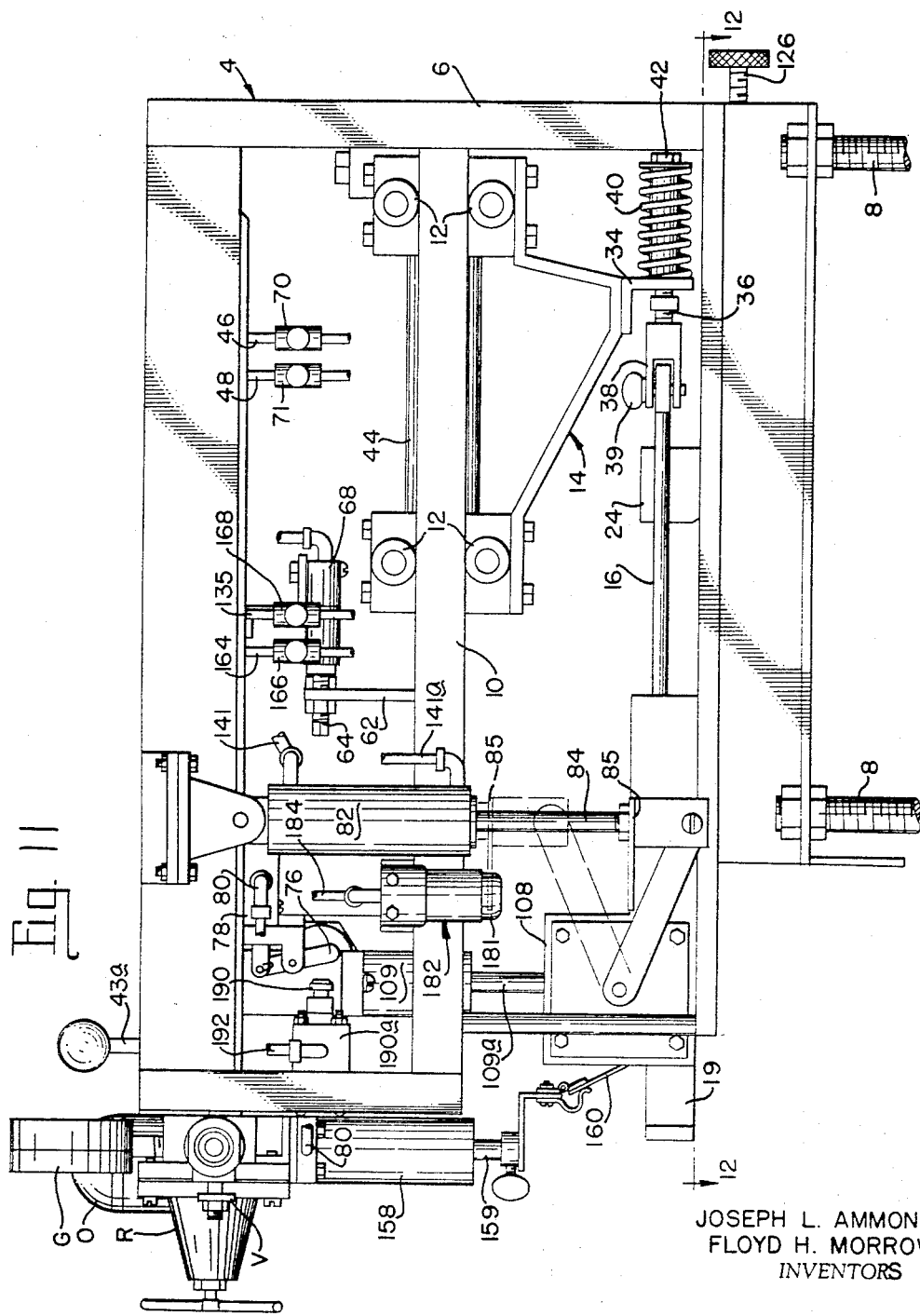
FIG. 11 is an enlarged side elevational view of the sausage stuffing mechanism with the support base broken away and with parts shown in section, and with the papering machine removed therefrom.
Figure 12:
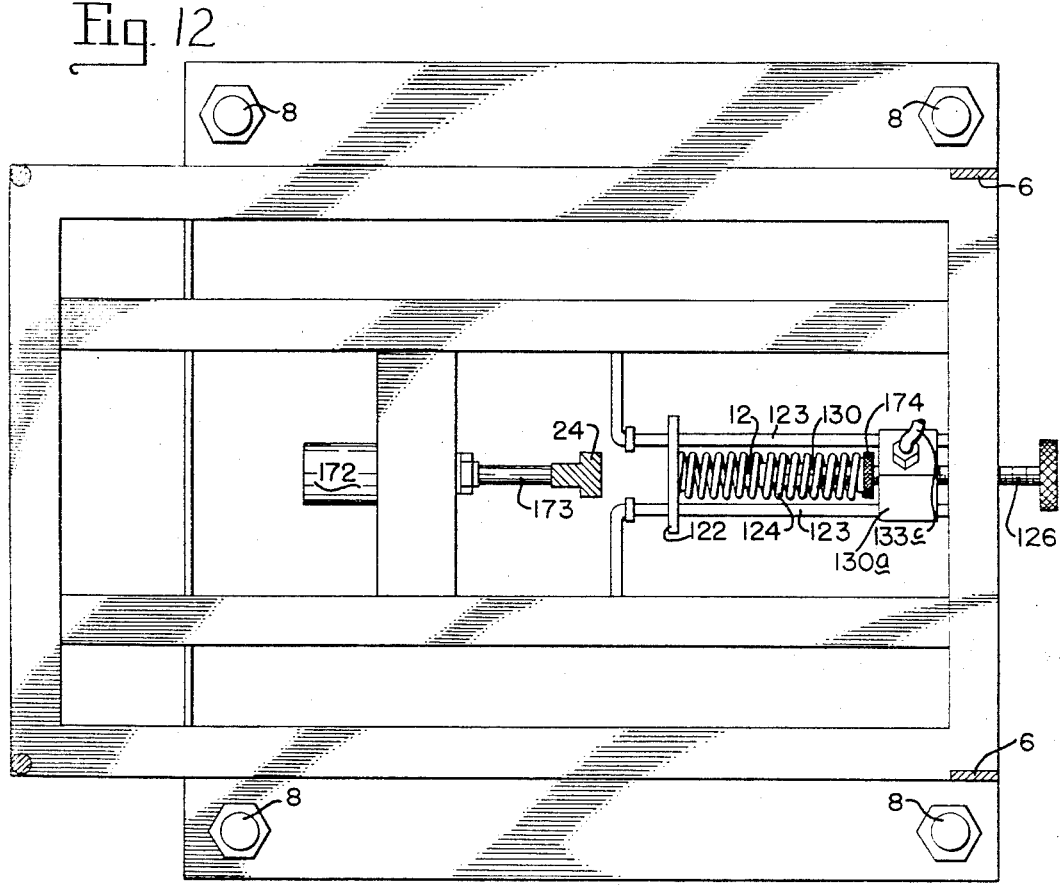
FIG. 12 is a sectional view taken on line 12—12 of FIG. 11, looking in the direction indicated by the arrows.

Simultaneously, air is directed from main air supply line 134 into branch air line 134b, through port 134c into the main cylinder, four-way reversing valve 79, FIGS. 10 and 15, and with the spool valve plunger 79a of the valve 79 in the position as shown in full outline FIG. 15, the air is directed through annular passage 79b, out through port 48a into air line 48 and through flow and check valve 71, without restriction, to the plunger end of main cylinder 44, which will retract plunger 50 in main cylinder 44 into the position as shown in FIG. 10, with the air being exhausted from cylinder 44 out through air line 46, through flow and check valve 70 in a restricted manner, and out through port 46a, through annular passage 79c and out through exhaust port 79d to atmosphere. Whereupon, the plunger 50, of the main cylinder 44, is connected to carriage 14 through transverse bar 52 by screw threaded portion 54 which has nuts 56 thereon on each side of bar 52. The carriage 14 will be moved to the rear-most position, as shown in FIG. 2, which will move pusher rod assembly 16 rearward to move the plugs 20 into sealing relation with the outer end of the bore of the respective mold cylinders 30. This movement causes plugs 20 to contact the face 28a of the respective pistons 28 to move the pistons rearward into the respective cylinders 30 but in contact relation with plugs 20. This action prevents air entering the cylinders 30, preparatory to the introduction of sausage material, as will be more fully described hereinafter.

Each of the plugs 20 has an O-ring 20a fitted therearound to complementally fit into the respective cylinders 30 in sealing relation when the plugs 20 are moved thereinto. Likewise each of the pistons 28 has an O-ring 28b therearound, so as to fit the respective pistons 28 in sealing relation with the respective cylinders 30.

Simultaneously, with the above mentioned cycles, air is directed through main air supply line 134 into and through friction slide valve 145, with the valve in the position as shown in FIG. 10, with the air passing through air supply line 144 to the end of paper cutter cylinder 146, opposite the plunger 146a thereof which moves the plunger 146a, carrying cutter blade 150 to an extended position, as best seen in FIGS. 9 and 10. The air is simultaneously directed from air supply line 144 into and through air line 144a into the plunger end of clutch actuating cylinder 144b to retract plunger 144c, which engages a clutch on the papering machine, designated generally at P, to control the feeding of paper or film from roll 152, in a manner set out in our co-pending application, Apparatus for Placing SheetMaterial on a Surface and Cutting to a Predetermined Length, Ser. No. 440,438, filed Mar. 17, 1965. As the plunger 146a is moved outward, air is exhausted through friction sleeve slide valve 145a, when the valve 145a is in the position as shown in FIG. 10. An air line 144d is connected with friction sleeve slide valve 145a to direct air into the opposite end of cylinder 146, as is fully brought out in our co-pending application, as mentioned above.

With the above operations performed, the machine is ready to be started; to start the operation of the sausage molding machine, the control lever 43a on the stop and start, three-way bleeder valve 43 is in upright position Y, as shown in full outline in FIG. 10, the lever 43a is moved to the right, FIG. 10, into bleeder line 133 and through port 133a on manually controlled valve 43, thence through annular passage 43b and out through port 43d to atmosphere. With the relief of pressure in chamber 132e, air pressure from the main air supply line 134 will pass through port 134a through passage 132f to exert pressure in the chamber 132g so as to move spool valve member 132a to the left, as viewed in FIG. 16, so that the annular passage 132d will register with ports 134a and 135a, whereupon, air will be directed from main air supply line 134 through port 134a, annular passage 132d and through port 135a into air supply line 135 to flow freely through flow and check valve 168, simultaneously into conduits 141 and 142 and 171, whereupon, the plungers 84, 137 and 173 of the oscillating valve cylinder 82, the stuffer valve cylinder 136, and the piston retractor 172, respectively, will be moved to extended position, whereupon, simultaneously with the introduction of air into air supply lines 141 and 142, air is exhausted from the respective plunger end of cylinders 82 and 136 out through air lines 141a and 142a into air line 164, and through flow and check valve 166, in restricted relation, to buffer the movement of the respective plungers 84 and 137, whereupon, air is exhausted through port 164a, through annular passage 132h in spool 132a in reversing valve 132 and out through port 132i to atmosphere. Upon extension of plungers 84, 137 and 173, the oscillating valve 100 and stuffer valve 118 will be opened, and cylinder 172 will retract pistons 28 to a position to open sausage inlet ports 114, and in so doing, a vacuum will be created in the respective cylinders 30, by this movement of pistons 28 out of contact relation with plugs 20, which action will position the pistons 28 adjacent the rear edge of sausage inlet ports 114 so as to allow sausage material to be pulled into the respective mold cylinders 30, by the vacuum, whereupon, the sausage material is also urged from stuffer supply casing 116, through open stuffer valve 118, through sausage supply pipe 120 into the cylinder 106 of the oscillating valve 100 in which is positioned spaced apart, segmental valve elements 101 and 104, and with the passage between the segmental valve elements being in communication with outlet ports 112 in oscillating valve cylinder 106 and sausage inlet ports 114 in register therewith, sausage material is directed into mold cylinders 30; simultaneously with the sausage being drawn into mold cylinders 30, by the partial vacuum, the sausage is also forced thereinto under pressure exerted on sausage material in the stuffer supply casing 116.

As soon as the spool 132a, in reversing valve 132, moves from the position as shown in FIG. 16, to the opposite end of the cylinder therein, the lever 43a is moved from the position as indicated at x to the position indicated at y, FIG. 10, the machine will be set in automatic cycle of operation and will thus continue so long as the machine is supplied with sausage material, unless the lever 43a is moved to a stop position as indicated at z, FIG. 10.

As the sausage material is being introduced, under pressure, into mold cylinders 30, the reaction of pressure of fluid sausage material reacts on the faces 28a of pistons 28, which will move pistons 28 rearwardly, with the sausage material flowing into the respective cylinders 30 to prevent air pockets or voids being formed in the sausage material within the cylinders 30. The pressure under which the sausage material is being moved into cylinders 30, will force block 24 rearward into abutting relation with transverse bar 122, which bar moves on parallel slide bars 123 to react on spring 124 to compress the spring to a predetermined setting of compression, as determined by adjustment nut 174, which is positioned on hollow, screw threaded extension member 176. The adjustment of the compression of spring 124 will determine the density of the sausage material within the cylinders 30, whereupon, when the transverse bar 122 is moved into contact with button 128, of the button bleeder valve 130, the button 128 is depressed against the tension of spring 128a therein, which will open a port in bleeder valve 130, FIGS. 10 and 20, which bleeder valve 130 is connected through air bleeder line 133c, which will relieve pressure from chamber 132g, FIG. 16, which will permit air, under pressure, from main air pressure line 134 to pass into port 134a into annular passage 132d in spool 132a and through passage 132j, to direct air, under pressure, into chamber 132e, which will move spool valve member 132a of reversing valve 132 to the position as shown in full outline in FIG. 16, with the air behind the respective plungers in cylinders 82, 136 and 172 exhausting out through lines 141, 142 and 171 into air line 135, and with the check member in flow and check valve 168 closed by air pressure exerted therein, as shown in FIG. 18, the air is forced through restricted orifice 168b, in valve 168, and through air line 135, port 135a into annular passage 132b and through port 132c to atmosphere, which completes the first cycle of operation.

Upon the shifting of spool member 132a of reversing valve 132, air is directed through air lines 164, 141a and 142a, under pressure, into the plunger end of the respective cylinders 82 and 136, the stuffer valve 118, which is connected to plunger 137, will be closed, as will oscillating valve 100, which connects to plunger 84. The plunger 84 carries an outstanding arm 85 thereon, which arm moves upward into contact relation with plunger 181 of re-cycling bleeder valve 182, which will bleed air from bleeder line 184 and from chamber 79e of four-way reversing valve 79, FIG. 15, in so doing, air from air supply line 134 will be directed through air supply line 134b through port 134c in four-way reversing valve 79, which valve is connected to main cylinder 44, into annular passage 79b in spool 79a and through passage 79f to exert pressure in chamber 79g, which will move spool 79a, under air pressure, to the left in valve 79, as shown in FIG. 15, which will initiate the second cycle of operation. Whereupon, air will be directed from main air supply line 134 through branch air line 134b, port 134c in valve 79, through annular passage 79b, and out through port 46a in valve 79 and into air line 46 and through flow and check valve 70, in an unrestricted manner, and into the end of the main cylinder 44 opposite the plunger 50 thereof, which will move plunger 50 outward, with the air from the plunger end of cylinder 44 being discharged out through air line 48 and through flow and check valve 71 in a restricted manner to buffer the outward movement of plunger 50, as the check valve therein will be seated and the air therein will be forced through a restricted orifice, out through air line 48, port 48a in four-way reversing valve 79, through annular passage 79h to exhaust through port 79j in valve 79 to atmosphere.

As the plunger 50 moves forward, the carriage 14, attached thereto by transverse bar 52, moves therewith, whereupon, pusher rod assembly 16, which passes through cylinders 32, moves head 18 forward. Plugs 20 are attached to the head 18 and will move out of the forward ends of the respective cylinders 30, which permits the sausage material, which is formed into sausages in the cylinders 30, to expand longitudinally within the sausage mold cylinders 30, which prevents distortion or deformation of the molded sausages, as the plugs 20 move outward. As the carriage 14 moves forward, out of contact with the sausage, adjustable screw members 186 move into contact relation with block 24, which screw members 186 adjust the outer terminal position of faces 28a of pistons 28. The block 24, piston rods 26 and pistons 28 move in unison with pusher rods 16, head 18 and plugs 20, and upon forward, outward movement of the head 18, a bracket 19, which is attached thereto, is moved outwardly and moves an arm 19a, which actuates the papering machine mechanism, as set forth in our co-pending application, as set out above. A chain 21 is pivotally connected to arm 19a and moves outward therewith to lift weight 21a, which is attached to the distal end thereof.

Simultaneously with the outward movement of arm 19a, the chain 21 engages a drive mechanism to roll the paper outward as the arm 19a, through associated mechanism, raises apron 188 to a substantially horizontal position, with a sheet of paper or film thereon to receive the sausage about to be ejected from cylinders 30, which mechanism for receiving paper on which the sausage is to be dispensed, is fully brought out in our co-pending application, as stated above.

As block 24 moves forward, it contacts plunger 173 of piston retractor cylinder 172 and moves the plunger to a retracted position. Air from cylinder 172 being exhausted through air lines 171, 135, through flow and check valve 168, in restricted manner, out through port 135a in reversing valve 132, through annular passage 132b and out through port 132c to atmosphere. By restricting the passage of air outward through passage 168b by needle valve 168a, the speed of ejection of sausages from cylinders 30 can be accurately controlled.

Upon continued movement of plunger 50 of main cylinder 44 and carriage 14, screw threaded adjustment member 66, which is mounted on upstanding arm 62 mounted on transverse bar 52, will move into contact relation with lever 76, on sausage cutter control valve 78, which will move the valve from the position as shown in FIG. 13, so as to move the spool 78a into position so that annular passage 78b will connect air line 134 through air line 78c to port 78d, thence through annular passage 78b and port 80a into air line 80 to direct air, under pressure into sausage cutter blade cylinder 158, which will move plunger 159 thereof rapidly outward to move cutter blade 160 across the outer face of cylinder block 108, to sever the sausage meat from the face end 28a of pistons 28; simultaneously with the extreme forward movement of carriage 14, the block 24, carrying piston rod assembly 22, has moved the pistons 28 to the outer terminal position in cylinders 30. The outer face terminal point of pistons 28 is adjusted by turning screw threaded members 186. The inner terminal location of faces 28a of pistons 28 is adjusted by the adjustment of thumb screw 126, by moving bleeder valve mounting block 130a and bleeder valve 130 forward or backward on parallel slide bars 123. In this manner the exact length of the cavities to be filled with sausage material in cylinders 30 can be accurately adjusted, without affecting the density control setting of spring 124. A threaded tubular extension 176 is screw threaded into bleeder valve mounting block 130a and into bleeder valve 130 and has a spring adjusting nut 174 thereon, which nut 174 adjusts the compression spring 124, which spring surrounds tubular extension 176 and is disposed between nut 174 and transverse bar 122.

Simultaneously with the opening of valve 78, the lever 76 is moved into engagement with button 190 on button bleeder valve 190a, which, in turn, bleeds air from the cavity of chamber 79g in valve 79, FIG. 15, which permits air from air supply line 134, under pressure, to be directed through branch air line 134b, through port 134c into annular passage 79b, whereupon, air is directed axially through passage 79k into chamber 79e to move spool 79a from the left end of valve 79, to the position shown in full outline in FIG. 15.

With the spool being so shifted, the air is then directed from the main air supply line 134, through branch air supply line 134b, port 134c, through annular passage 79b and out through port 48a into air supply line 48 through flow and check valve 71 in an unrestricted manner, thence through air supply line 48 to the plunger end of the main cylinder 44, which will act upon the plunger to move the plunger 50 into a retracted position, as shown in FIG. 10, thereby exhausting air out through air line 46 through flow and check valve 79, in a restricted manner, through air line 46, port 46a in valve 79, and into annular passage 79c to exhaust out through passage 79d to atmosphere. As the carriage 14 moves away from lever 76, on cutter control valve 79, a spring 78e will urge spool 78a of spool valve 78 outwardly to stop the air supply to cylinder 158 and to permit air to be exhausted from cutter blade cylinder 158 out through air line 80, through port 80a, through annular passage 78f to exhaust through passage 78g to atmosphere.

Upon rearward movement of valve control lever 76, the lever moves away from button 190 of bleeder valve 190a, which allows the valve 190a to close, ready for subsequent cycle operation. Upon the ports being opened to exhaust air from cutter blade cylinder 158, the spring 159a moves plunger 159 rapidly upward to disengage the cutter blade from the sausage which has been ejected from the mold cylinders 30. This re-positions the cutter blade 160 for the next cycle of operation.

As the carriage 14 moves to the rear-most position, adjusting screw 64, on upstanding arm 62 moves into contact relation with a re-cycling bleeder valve 68, FIGS. 2, 10 and 17, whereupon, the movable button 69 is contacted by adjustable screw member 64, the movable button 69, which has a chamber 68a therein, which chamber is filled with air under pressure, forces valve body 68b rearward to move valve 68c off seat 68d, which will permit air to escape from chamber 68e, FIG. 17, and chamber 132e, FIG. 16, through port 68f to atmosphere, which will permit spool 132a in reversing valve 132, as shown in FIG. 16, to shift to the left, which will permit the spool 132a in reversing valve 132 to move to the extreme left end, under air pressure passing from main air supply line 134, through port 134a, annular passage 132d, air passage 132f into chamber 132g, which will maintain spool 132a in this position, whereupon, air will pass from main air supply line 134, through port 134a, annular passage 132d and out through port 135a into air line 135 to repeat the cycle of operation of cylinders 82, 136 and 172, as herein before set forth, with the air exhausting from the oscillating valve actuating cylinder 82 and stuffer valve cylinder 136, out through air line 164 and port 164a, annular passage 132h, port 132i to atmosphere, to repeat the cycle.

As soon as the pressure is relieved from chamber 68a, in bleeder valve 68, by air passing out through port 68f, a spring 68g urges valve body 68b forward, which forces valve body 68h into telescoped relation inside chamber 68a, until the adjustment screw 64 moves out of contact relation with movable button 69, whereupon, chamber 68a refills with air, under pressure, from main air supply line 134, passing through port 134a into annular passage 132d into passage 132j and out through passage 133b into air line 133 and into chamber 68e and through passage 68i to force button 69 outwardly and to refill chamber 68a with air, under pressure, which completes the second or molding cycle and sets all valve and mechanisms ready to automatically reinstitute, the first or filling cycle.

After the desired molding cycle has been completed and it is desired to stop the machine, the valve control lever 43a of start and stop, three-way bleeder valve 43, is moved manually from the central position, as indicated at y, in FIG. 10, to the position z, indicated in dashed outline therein, whereupon, spool 43e of valve 43 will be moved inwardly so that annular passage 43g will register with ports 43h and 43i, whereupon, air is bled from chamber 132g in valve 132 and out of bleeder valve 130 through line 133c, through port 43h, through annular passage 43g and out through port 43i in stop and start, three-way bleeder valve 43. This permits air under pressure to be directed from main air supply line 134 through port 134a, annular valve passage 132d in the valve spool 132a of reversing valve 132, and through passage 132j into chamber 132e to exert pressure on the end of spool 132a of valve 132 to move the valve to the position as shown in full outline in FIG. 16. Whereupon, air will be directed from main air supply line 134, through port 134a into annular passage 132d in spool 132a, thence out through port 164a in valve 132 and into air line 164 and through flow and check valve 166 in unrestricted manner, and into air lines 141a and 142a into the plunger end of oscillating valve cylinder 82 and stuffer valve cylinder 136, respectively, to move the respective plungers 84 and 137 into retracted position, which will close oscillating valve 100 and stuffer valve 118, whereupon, air is exhausted from oscillating valve cylinder 82, stuffer valve cylinder 136 and piston retractor cylinder 172 from the end opposite the plunger of the respective cylinders, into air lines 141, 142 and 171, respectively, into air line 135 and through check and flow valve 168, FIG. 18, and with check valve member 168c closing passage 168d, air is diverted through passage 168b in a restricted manner, which restriction embodies a needle valve 168a, which constricts the discharge passage 168b therein to the desired adjusted restriction, to regulate the out-flow of air therethrough and through port 135a into annular passage 132b and out through discharge port 132c in reversing valve 132, which will stop the operation of the sausage molding machine, closing the stuffer valve 118 and the oscillating valve 100, thereby preventing further sausage from entering the machine, until valve control lever 43a of valve 43 is moved to position x, FIG. 10, which will immediately stop the machine, if it is operating in the first or filling cycle, at the time the lever 43a of valve 43 is moved to the position indicated at z. However, if the machine is in the second cycle of operation, the molding cycle is reinstated, as set forth above.

Upon moving lever 43a into the position as indicated at z, FIG. 10, the mechanism will continue through the normal cycle and eject any sausage from mold cylinders 30, and then return the carriage 14 rearwardly to complete cycle two, in its entirety. However, when the button 69 of button bleeder valve 68 is depressed, air is bled therefrom and from spool valve member 132a in reversing valve 132. The spool valve member 132a does not shift, as it normally would, because the air pressure from chamber 132g in reversing valve 132 has been bled out through air line 133c, port 43h, annular passage 43g and out through port 43i to atmosphere, in three-way stop and start valve 43.

When the molding operation has ceased and the machine is stopped, the lever 43a may be returned to position y, indicated in FIG. 10, which will prevent further loss of air from port 43i. Both bleeder valves 68 and 130 are then recharged with air pressure, however, the machine will not operate until lever 43a is again returned, momentarily, to the position indicated at x, FIG. 10, to bleed the air pressure from air line 133. This allows the air pressure in line 133e to force the spool valve member 132a to shift to the left, FIG. 16, which results in air being directed from air supply line 134 to the stuffer valve cylinder 136, the oscillating valve cylinder 82 and to the piston retractor cylinder 172 through air lines 135, flow and check valve 168, air lines 142, 141 and 171, respectively, with the plunger 173 moving the pistons 28 to the rear edge of sausage inlet ports 114. This institutes the filling cycle and puts the machine back into automatic operation, upon returning lever 43a to the position, as indicated at y, FIG. 10.

The present sausage molding machine is so designed that the speed of each step of the operation can be controlled independently, without altering the speed of operation of another step in the operation of the molding machine. The outward speed of movement of plunger 50, of the main cylinder 44, is controlled by a restricted orifice in valve 71, in air line 48 which leads from the plunger end of cylinder 44 to four-way valve 79. The valve is a combination flow and check valve of the construction as shown in FIG. 18, therefore, by adjustment of needle valve member 71a the outward speed of the plunger 50 may be regulated from a complete, full flow release of air therefrom to a gradual movement, by restricting the orifice therein, such as orifice 168b in valve 168, or if desired, the needle valve member may be completely closed, whereupon, the movement of the plunger will cease.

The inward movement of plunger 50 permits full flow of air through line 48 and the orifice in valve 70 is restricted by a needle valve member 70a, in a manner similar to the restricting of the orifice in valve 71. With the movement of plunger 50 regulated to the desired speed in either direction, the movement of carriage 14 is also regulated to the same rate of speed, to contact the various valves and to perform the various functions, as have been set out hereinbefore. The control of the speed of the plunger 50, in either direction, likewise controls the steps of operation of the molding machine with respect to that particular step of the operation.

A valve 166 is within air line 164, which connects with branch air lines 141a and 142a, which air lines connect respectively to the plunger ends of oscillating valve cylinder 82 and stuffer valve 136, therefore, by regulating the flow of air from cylinders 82 and 136, while pressure is being applied to the opposite ends of the plungers, through air lines 141 and 142, the speed of the plunger of each of these cylinders, on the outward movement, can be minutely regulated by regulating the needle valve member 166a to restrict the outflow of air through the orifice thereof, which valve is similar in construction to valve 168, shown in FIG. 18. At the same time that air is being restricted, air may be allowed to flow from the plunger ends of cylinders 82 and 136, and air is being directed from reversing valve 132 through air line 135, and through flow and check valve 168, with the flow therethrough being unimpeded, into the ends of the cylinders opposite the respective plungers. However, when the plungers 84 and 137 reach the distal ends of movement thereof for movement of valves 100 and 118, respectively, the spool valve member 132a in valve 132 is reversed in the manner set out above, whereupon, while air is being exhausted from the plunger ends of cylinders 82 and 136, and with reversing valve switched to direct a full flow of air through flow and check valve 136 into the respective plunger ends of cylinders 82 and 136, the outflow of air from these cylinders, from the end opposite the plunger, as well as the plunger 173 in piston positioner cylinder 172, will be discharged out through air lines 141, 142 and 171 into air line 135 and through restrictor valve 168 to control the retraction of the respective plungers 84, 136, and 172. The speed of the plungers can be accurately regulated in accordance with the adjustment of needle valve 168a with respect to the orifice 168b. With these valves so controlling the return of each piston by controlling the escape of air from the respective cylinders, as set forth, an even speed is attained, or, if desired, the speed of one or more of the steps of operation may be increased and any one step of the operation may be so regulated as to perform the function in the desired manner.

It is to be further pointed out that the cylinder block clamp cylinder 109 is a single acting air cylinder, and upon turning the air into the system by opening valve V, the air is immediately directed through air supply line 134 into air line 109b so as to compress spring 109c and clamp the cylinder block 108 in place against movement in any direction. The cylinder block 108 has holes in the lower side thereof to complementally receive dowel pins 111, and as long as the air is impressed on the system the plunger 109a will be extended to clamp the cylinder block 108 in place. However, when it is desired to clean the machine, at the end of the operation, the air valve V is closed, whereupon the air through the various bleeder valves will bleed the air pressure from the system and the spring 109c will retract the plunger 109a, which will enable the pusher rod 16 and head 18 to be removed by withdrawing the plunger rods out through cylinders 32, as will best be seen in FIG. 5; then by disconnecting a union 121 on sausage supply pipe 120 and by removing the piston assembly 22, the lever 88 may be disconnected from plunger 84, then the cylinder block 108 may be lifted from the dowel pins 111, FIG. 2, to enable the cylinder block assembly, including the valve mechanism therein, to be cleaned, inspected, or repaired. After the cylinder block 108 is removed from dowel pins 111, easy access may be had to segmental, oscillating valve 100 to enable the unit to be readily disassembled for cleaning, repair, or inspection. The inverse steps may be taken to reassemble the segmental, oscillating valve 100 into various component parts used in connection with cylinder block 108, preparatory to subsequent sausage molding operations.

The present skinless sausage molding machine is preferably operated with an apparatus for placing sheet material on a surface and cutting to a predetermined length, which places a sheet of paper, film, or the like on the apron 188 in timed sequence with the operation of the sausage molding machine. The air line 134 directs air into air lines 144 and 144d, which lines direct air into friction sleeve valves 145 and 145a, which are actuated by cams moving in co-ordinated relation with the apron 188, so as to place the sheet of paper, film, or the like on the apron, to the desired length, and then, after the molded skinless sausage is ejected thereonto, the paper or film is cut to the desired length, as is fully brought out in our application, Ser. No. 440,438, filed Mar. 17, 1965.

*Alternate form of molding machine*

The alternate form of sausage molding machine is similar in construction to the aforementioned form of the invention, and is pneumatically actuated to enable the machine to mold sausages in a continuous cycle, for as long as desired, or until the sausage material is exhausted.

The present form of the invention is shown in FIGS. 21 through 46, inclusive, with FIG. 21 showing a composite side elevational view of an upright support frame, which is designated generally at 201, which frame has mounted thereon a sausage molding machine designated generally at 210. This form of molding machine is pneumatically actuated, and is connected to a conventional pneumatically actuated sausage stuffer 220, in a manner well understood in the art of sausage making, and which is set out more in detail in the aforementioned form of the invention. The conveyor assembly, designated generally at 230, is also pneumatically operated.

The sausage molding machine 210 has a structural frame, designated generally at 212, which is constructed of angles and bars to form bottom, top and corner members, as will best be seen in FIGS. 21, 22, 29 and 30. It is preferable to have the structural frame 212 closed on each side by hinged doors 234, a top cover plate 236, which has a handle 237 thereon, and a rear end cover shield 238, and a front end cover member 240, so as to enclose the mechanism within the structural frame 212. A pair of longitudinally spaced apart trackways 242 are provided, one on each side of the structural frame 212, on which trackways a carriage 244 is supported on antifriction roller members 246, which roller members are positioned above and below the respective members of the trackway 242, so as to insure proper guidance of the carriage 244 along the trackway 242. The carriage 244 is angularly and transversely braced and has downwardly depending legs 248, which legs are held in spaced apart relation by a transverse, screw threaded stay bolt 250, which has nuts 251 on each side of each of the downwardly depending legs 248. Longitudinal connecting rods 260 are fixedly secured to the lower ends of the downwardly depending legs 248 and extend forwardly through a pair of transverse piston rod retainer blocks 262, which blocks each has interfitting connections therein to fixedly secure the ends of piston rods 264 therebetween, as will best be seen in FIGS. 30 and 34. Each piston rod 264 has an annular recess 266 formed therein, near the rear end thereof to be complementally received by respective complemental bosses which are formed within complementary, transverse piston rod retainer blocks 262. The retainer blocks 262 are held securely together by cap screws 268.

Each end of each retainer block 262 has a bearing 270 therein to slidably receive the longitudinal connecting rods 260 therethrough in sliding relation. The longitudinal connecting rods 260 extend forwardly through a sausage molding cylinder block 272, and have acorn-like nuts on the ends thereof, which nuts hold sausage residue pan 276 in binding engagement with a cylinder closure block 278, so, upon movement of carriage 244, the closure piston block 278, mounting mold cylinder closure pistons 279 therein, and the sausage residue pan 276 will move therewith.

A pneumatically actuated main cylinder 280 is secured to the structural frame 212, near the top thereof, by means of a fastening member 282. A shaft 284 extends outward from the main cylinder 280, which shaft is secured to a cross bar 286 which extends across the forward end of the movable carriage 244, so, upon the shaft 284 moving forward, the rollers 246 on carriage 244 will move along trackway 242 in guided relation.

The structural frame 212 has inwardly extending ears 288 secured to the lower side thereof, near the rear end of the frame, which ears are apertured to receive a bolt 290 therethrough and through an apertured lug 292 on the rear end of piston retractor cylinder 294. The piston retractor cylinder 294 has a screw threaded shaft 296 extending outwardly therefrom, which shaft has nuts 298 thereon to threadably engage the shaft on each side of a cross member 300.

The sausage molding cylinder block 272 has sausage molding cylinders 302 fitted therein, which cylinders are preferably made of stainless steel or other non corrosive material, each of which cylinders has the adjacent sides thereof slotted to form chordal openings or elongated slots 302a, as will best be seen in FIGS. 25 and 32, so all the cavities 303 of the molding cylinders 302 are connected to be in common communication. Sausage ejection pistons 301 have adjacent faces thereof flattened to define chords 301a, as will best be seen in FIG. 36. Each ejection piston 301 has an O-ring thereon to for a seal with the wall of the respective molding cylinders of cylindrical mold segments 302. The adjacent flattened sides 301a of pistons 301 will fit together in contact relation when fitted within molding cylinders 302. Each of the molding cylinders 302 has an inlet orifice 304 in the top thereof to provide for the introduction of sausage material into the individual molding cavities 303 which are formed within the molding cylinders 302 between the forward ends of the respective sausage ejection pistons 301 and the inner face of the respective closure pistons 279, which are mounted on the closure piston block 278, which closure pistons each has an O-ring 488 thereon to form a tight closure within the respective molding cylinders 302.

The sausage stuffer 220 is connected with sausage inlet manifold 324 through sausage inlet pipe 322 and L fitting 323. The sausage stuffer 220 has a conventional lid 319 thereon to enable sausage material to be loaded thereinto. A sausage stuffer outlet control valve 321 is positioned intermediate the length of sausage inlet pipe 322. When the sausage material is loaded into sausage stuffer 220, air pressure is applied through air inlet pipe 320 to the lower end of sausage stuffer 220 in a manner well understood in the art of sausage stuffers, as will best be seen in FIGS. 21 and 28. The cylindrical portion of the manifold 324 is preferably made of stainless steel, and has an arcuately movable parti-cylindrical valve member 305, preferably made of plastic such as Teflon, fitted therein as will best be seen in FIGS. 25, 28 and 35, so the valve member 305 will complementally fit within the cylinder portion of manifold 324 in fluid tight relation, when pressure is exerted within the manifold 324. The arcuately movable sausage material valve member 305 has an elongated, slotted opening 470 formed in the side thereof opposite the inlet opening thereof, which slotted opening 470 is adapted to register with inlet orifices 304, when the arcuately movable sausage valve member is in one position, so as to pass sausage material therethrough and into the molding cavities 303, when in one position, as will be more fully brought out hereinafter, and to close inlet orifices 304, when the arcuately movable valve member is in another position.

The arcuately movable sausage material valve member 305 is adapted to complementally receive a valve turning member 442, which is preferably of a plastic, such as Teflon, in each end thereof and which valve turning members each has a turning vane 469 thereon, which vane complementally closes the slot 470 in each end of the arcuately movable sausage valve member 305. However, prior to the insertion of valve turning members 442, a manifold closure members and shaft bearing 441, of plastic such as Teflon, are each slid onto a shaft 440, which closure members each has an O-ring 441a therein which forms a fluid tight seal with the inner cylindrical portion of manifold 324 near each end thereof. An O-ring 440a, FIG. 35, is fitted around shaft 440 and forms a seal with the inner diameter of the manifold closure members and shaft bearings 441 and the respective shafts 440. With the manifold closure members and shaft bearing 441 in place, as shown in FIGS. 25 and 30, the valve turning members 442 are each slid onto the respective shafts 440 until a transverse hole in each shaft is in register with a transverse hole in the respective turning members 442, whereupon, locking pins 443 are passed through the respective sets of holes in the respective turning members 442 and the shafts 440. These pins are preferably of stainless steel or other non corrosive material. A gear 439 is fitted on each shaft 440, which gears are secured in place by set screws or the like, so that the arcuately movable sausage valve member 305 may be accurately and correctly timed, as will be more fully brought out hereinafter.

It is preferable to have timing arrows or other indicia 439a on each of the gears 439 so as to determine the relative position of the slotted opening 470 in the arcuately movable sausage material valve member 305 with respect to the inlet orifices 304 so as to enable the movable gear rack 457 to be correctly positioned for operation of the arcuately movable sausage material valve member 305, as will be more fully brought out hereinafter.

The manifold 324 is mounted within a sausage inlet manifold block 459 so as to form a substantially unitary piece of equipment, which may be assembled by the use of silver solder, stainless steel, or the like, or the unit may be made in one piece of nontoxic, noncorrosive material. With the manifold block 459 thus assembled, as shown in FIGS. 33 and 28, and with the assembly secured on the sausage molding cylinder block 272, as by bolts or the like, the assembly is ready to be fitted within the structural frame 212, so the gears 439 will mesh with gear racks 457 for operation in a manner more fully brought out hereinafter, when fitted into the machine, the turning members 442, bearings 441 and shafts 440 are held in place by abutment of the ends of the shafts 440 against the inner face of structural frame 212.

The sausage molding cylinder blocks 272 have holes therethrough for bolts or studs to pass therethrough to secure the blocks in place, as will best be seen in FIGS. 28 and 30. The sausage molding cylinder block 272 has a hole or opening 484 formed therein near each side thereof, parallel with the cylinders 302, to receive rods 260 therethrough, in loose fitting relation, which rods 290 pass through closure piston block 278 and through residue pan 276, with acorn-like nuts 274 screw threaded onto the outer ends of the rods 260. A screw threaded rod 432 passes longitudinally through the closure piston block 278 and transversely through holes in connecting rods 260 and through transverse holes in closure pistons 279. The screw threaded rod receives a nut 233 on each end thereof to maintain the screw threaded rod in place to secure the closure pistons 279 within holes 313a, as will best be seen in FIGS. 28, 33, and 34.

With the connecting rods 260 fixed against movement with respect to closure piston blocks 278, the acorn-like nuts 274 bindingly engage residue pan 276 to maintain the residue pan in close fitting relation against the outer surface of closure piston block 278.

The molding cylinder closure pistons 279 are shouldered and have the smaller ends thereof fitted within the respective holes 313a, in a manner best seen in FIGS. 23 and 28, with interstices 313 between adjacent holes 313a for the excess sausage to pass into the residue pan, as will be fully brought out hereinafter.

The air system is illustrated diagrammatically in FIG. 46, and shows the air supply inlet connection 316 connected to a conventional source of air pressure, which pressure is usually 140 to 160 pounds p.s.i., with the main control valve 317 shown therein, with the full outline position, indicated in FIG. 46, allows air to pass therethrough into air line 330 to furnish air under pressure for the air actuated mechanisms of the molding machine 210. The main air valve 317, shown more in detail in FIG. 45, has a movable sleeve 329, which sleeve may be moved to the position as shown in dashed outline, FIG. 46, which will close off the air supply to the air actuated mechanisms of the molding machine 210 and bleed air therefrom, as will be more fully brought out hereinafter. The air system is provided with a conventional air filter 334, an air pressure regulator 335, and an air lubricator 336 within air line 330. An air line 340, which is preferably flexible, is attached to the lubricator and to a connection 337 on the sausage molding machine 210, as is best seen in FIGS. 21, 28 and 46.

A main air supply line 355 leads from the connection 337, with branch air supply lines 331, 332 and 333 leading therefrom. The branch air supply line 331 leads to reversing valve 346, branch air supply line 332 leads to cutter blade actuating valve 347, which valve is a spring return valve, and the branch air supply line 333 leads to reversing valve 345.

Air bleeder line 365 leads from one end of valve 345, as shown in detail in FIG. 38, to a recycling bleeder valve 341, as shown in detail in FIG. 42, which valve 341 has a depressable head 437 which may be depressed thereinto. The opposite end of reversing valve 345 has an air bleeder line 366 leading therefrom to mounting block 445 on which button bleeder valve 342 is mounted in fluid communication with air bleeder line 366.

The button bleeder valve 342 has an outwardly extending shaft therein, with a button 415 thereon for cooperative relation with the contact arm 498 which is associated with the cutter blade 311, FIGS. 23 and 28. The button bleeder valve 342 is screw threaded into mounting block 445 and is in fluid communication with air bleeder line 366. A spring 416 surrounds the valve stem within pasage 427 and is biased between the body of valve 342 and the button 415, which is threadably attached to the valve stem of valve member 417 so as to normally maintain the valve member 417 in complementary seated relation in the valve 342, as will best be seen in FIG. 41. However, upon depressing button 415, the passage of air will be permitted by valve member 417 through passage 427 to exhaust out through exhaust orifice 390 to perform the function of bleeding air from cavity 414 in reversing valve 345.

The reversing valve 345 has a valving mechanism therein, as illustrated in FIG. 38, with orifices 375, 376 and 377 interconnecting air lines 373, 333 and 372, respectively, with the inner bore of the valve on one side, and with orifices 381 and 382 connecting the bore of the valve 345 with the respective air lines 356 and 358.

The reversing valve 345 has a longitudinally movable spool 479 fitted within the bore thereof and, when air pressure is applied in cavity 413, with bleeder valve 341 closed, the spool will be moved to the position as shown in full outline in FIG. 38, and when pressure is applied to cavity 414, with button bleeder valve 342 closed, the spool 479 is moved to the position at the left, as brought out fully in the operation. The body of spool 479 of valve 345 has annular grooves formed therein, which form annular openings 378, 379 and 380 therein, which interconnect with certain orifices within the valve body of valve 345, when in a different longitudinal position. The spool 479 has bleeder orifices 383 and 384 interconnecting the annular openings 379 with the respective cavities 413 and 414. The operation of this valve is fully brought out hereinafter.

Reversing valve 345 has air lines 356 and 358 connected thereto, as will best be seen in FIG. 46. A branch air line 481 connects to the rear end of main air cylinder 280 and to air line 356 to exert air pressure on piston 339 therein to move shaft 284 outwardly. A branch air line 357 connects with air line 356 and to the end of air actuated conveyor cylinder 350, opposite the shaft end thereof, to urge piston 480 and shaft 354 outward, when air pressure is applied thereto through air line 357. A branch air line 360 connects with air line 358 and to the shaft end of main air cylinder 280 to move the piston 339 and shaft 384 into retracted position, as shown in FIG. 46. A branch air line 359 is connected to air line 358 and to the shaft end of air actuated cutter blade cylinder 348, which air pressure will move piston 491 and shaft 352 to retracted position, as shown in FIG. 46. The actuation of which valves and cylinders will be brought out more fully in the operation.

The branch air supply line 332 is connected with cutter blade actuating valve 347, which valve is shown more in detail in FIG. 39. The valve 347 has a bore therein to receive a spool valve member 490 which has annular grooves 385 and 386 to form an opening therearound. The air line 332 is connected through an orifice 389 to the bore within the valve 337 and an air line 362 is connected on the opposite side of the valve body to the bore therein through an orifice 387. An air discharge line 371 has an orifice 388, which connects the bore within the body with the discharge line.

The valve 347 is normally maintained in the position as shown in FIG. 39, by the resilient action of spring 510, however the valve may be shifted by the movement of lever arm 436 from the position as shown in full outline to that shown in dashed outline in FIG. 46, at the shifting of the spool 490 within the valve body, to interconnect certain orifices, when in one position and to connect certain other orifices therein when the valve is in another position, which will be more fully brought out hereinafter.

The air line 362 leads from valve 347 to the upper end of the cutter cylinder 348, which actuates the cutter blade 311, and when air is applied to the upper end thereof, the piston 491 and plunger 352 in cylinder 348 are moved downward within the cylinder, as will be more fully described hereinafter.

A branch air line 331 connects with the reversing valve 346, as best seen in FIGS. 40 and 46, and supplies air thereto. The body of valve 346 has a bore therein to receive a longitudinally slidable spool 464 in the same manner as set out for valve 345. The longitudinal bore has a cavity 411 formed in one end thereof and has the cavity 412 formed in the opposite end thereof with the spool 464 positioned therebetween. Annular grooves 404, 405 and 406 form annular openings which are connected with orifices 401, 402 and 403, respectively, with the orifice 401 being connected with an air outlet line 370, the orifice 402 being connected with air supply line 331, and the orifice 403 being connected with an air outlet line 369. Air lines 363 and 364 are connected with the bore within the body of valve 346 by orifices 407 and 408, which orifices are in fluid communication with certain of said annular openings in spool 464, during the cycle of operation, as will be more fully brought out hereinafter. The spool 464 has orifices 409 and 410 therein which connect with annular openings 405 in spool 464 and with the respective orifices being in fluid communication with the respective cavities 411 and 412 within the body of the valve 346. An air bleeder line 367 connects with button bleeder charging valve 343, which button bleeder charging valve 343 is mounted on button bleeder mounting block 308, which block is mounted in sliding relation on parallel slide rods 424, which rods are mounted on the structural frame 212 rearward of transverse piston rod retainer blocks 262. The valve mounting block 308 has an adjustable extension arm 307 threadably mounted therein for connection with transverse piston retainer blocks 262, upon rearward movement of these blocks, as will be fully described in the operation. Set collars are provided on the slide rods 424 to limit the forward movement of mounting block 308, as a spring 418 is biased between the slide block 308 and the sausage compression or density control screw 448, FIG. 28, which screw threadably engages a member at the rear end of the structural frame 212, as is best seen in FIGS. 28 and 30.

The valve 343 is within the compression spring 418 and has the depressable button 419 thereof in axial alignment with the length control screw 449, which screw is threadably fitted within a screw threaded axial opening in density adjustment screw 448, FIG. 28. The body of valve 343 has an axial bore therein which receives valve member 423, the screw threaded stem 422 thereof threadably engaging depressable button 419, with a spring 421 being biased between a shoulder within the bore of the valve 343 and the button 419, so, upon the button 419 being depressed against the resilient action of spring 421, the valve member 423 will be unseated from valve seat 471, thereby to permit air to pass from cavity 411 in valve 346 and through bleeder air line 367 into block 308 and into air passage 473 and out through exhaust bleeder orifice 420.

The opposite end of reversing valve 346 has a bleeder line 368 leading from cavity 412 to recycling bleeder valve 344, as shown in FIGS. 43 and 46.

As more fully described hereinafter, the reversing valve 346, during one portion of the cycle, bleeds air through air bleeder line 368 into air cavity 391 of recycling bleeder valve 344, and the head 433 thereof is maintained in rigid control of valve 344 by the valve seating on O-ring valve seat 461 until the head 433 is depressed by adjustment screw 434, which screw is mounted on crossbar 286 of carriage 244, as the air in chamber 391 is common with the air in cavity 395, through passage 394. Upon depressing head 433 to unseat valve seat 461, the valve member 460 is moved against resilient action of spring 426 until air, under pressure in cavity 391 and in cavity 395 passes out from the respective cavities through passage 392 into air chamber 463, thence out through exhaust port 393 to atmosphere. This will permit air under pressure to move spool 464 in valve 346 to the right hand position, as indicated in FIG. 40.

The recycling bleeder valve 341 is identical in construction to the valve 344, and is connected with reversing valve 345 through bleeder air line 365 in a manner similar to that set out for valve 346. The recycling bleeder valve 341 has a body 378 therein, which body has a cavity 396 formed intermediate the valve member 377 and the inlet pipe 365, which cavity 396 is in fluid communication with cavity 400 in head 437 by a passage 399, which maintains the valve in seated relation on O-ring seat 474, when the cavities 396 and 400 are pressurized. The head 437 is depressed by adjusting screw 446, which screw is mounted on cross member 300. The cross member 300 is connected to shaft 296 of piston retracting cylinder 294. Upon head 437 being depressed by adjustment screw 446 against the resilient action of spring 398, which spring is biased between valve member 477 and valve body 478, the valve member is moved inward, which will release pressure from cavity 398 through passage 397 into cavity 476 and out through exhaust port 475 in valve body 478 to atmosphere.

The main control valve 317 is shown in FIGS. 45 and 46, which valve comprises a body 321a, FIG. 45, which body has separate L-shaped passages 325 and 327 therein, which passages each has a branch end thereof extending laterally outward to terminate on the peripheral surface of the body a spaced distance apart. A sleeve 329 is fitted over the body 325a which has O-rings 328 near each end thereof, with an annular groove 326 formed within the sleeve intermediate the O-rings 328, so, when the sleeve is in one position, a seal will be had with the body 325a on each side of the branch ends of the L-shaped passage 325 and 327 so as to pass air, under pressure, from connection 316 through passage 325, annular groove or opening 326 into passage 327 and into air supply line 330, however, the sleeve 329 may be shifted to the position indicated in dashed outline, FIG. 46, so that the air from the main air supply line through air connection 316 will be contained in passage 325, and air passage 327 will be open to atmosphere to bleed air from the air system of the sausage molding machine. With the sleeve 329 in the position as shown in full outline, FIGS. 45 and 46, air pressure will be impressed on the operating mechanism of the sausage molding machine 210, however, unless sausage material, under fluid pressure is within stuffer 220, and the sausage stuffer outlet valve 321 is open, the molding machine will not operate. Therefore, the sausage stuffer outlet control valve 321 may be used to start and stop the air actuated sausage molding machine and to vary the speed of operation thereof.

Each of the rack movement rods 467 has a screw threaded bolt 454 axially engaging the respective forward ends thereof, which enables the adjustment of the bolts 454 with respect to each gear rack movement rod and with respect to the face 468 of the gear rack mounting block 456, to enable accurate timing of the arcuately movable sausage valve member 305 by accurately positioning the teeth of each gear rack 457 with respect to the teeth of each gear 439, each of which gears is adjustably attached to the respective shafts 440. Each of the gear rack mounting slide blocks 456 is slidably mounted within a longitudinal slot in the lower portion of the structural frame 212, as will best be seen in FIGS. 25 and 37. A set collar 453 is adjustably secured to each of the bolts 454, as shown in FIGS. 29 and 30, which set collars move against the rear face of gear rack mounting slide block 456 to move the slide block 456 forwardly a predetermined distance, upon movement of transverse crossbar member 300, which crossbar member is attached to the shaft 296 of piston retractor cylinder 294. The cross bar member 300 is also secured to gear rack movement rods 467 by bolts 451.

With the bolts 454 sliding within openings 458 in gear rack mounting blocks 456, a loose linkage arrangement is provided to open the arcuately movable sausage particylindrical valve member or means 305, after a predetermined dwell, and closing the valve member 305, after a predetermined dwell, with respect to the operation of the other mechanism of the sausage molding machine, as is fully brought out in the operation.

*Conveyor*

The conveyor, designated generally at 230, is associated with the molding machine 210, as shown in FIG. 21, but it is not a necessary element for the proper operation of the molding machine 210, but it is a suitable accessory adjunct thereto to convey the sausage therefrom, and the conveyor cylinder 350 is connected, through branch air lines 357 and 361, with air lines 356 and 358, respectively, FIG. 46, so that the piston 480 within the cylinder 350 will actuate a shaft 354 lineally, which shaft is connected to a chain 499 in meshed engagement with sprocket 500, which sprocket has a bearing 508 therein. The sprocket 500 is journaled on shaft 501, which shaft is mounted within the frame of the conveyor, so as to rotate the sprocket in a counter-clockwise direction, FIG. 28, on the outward movement of shaft 354, without rotating shaft 501, under the resilient tension of spring 506, which spring is secured to the distal end of chain 499 from shaft 354. The other end of the spring 506 is anchored to the frame of the conveyor 230. However, upon inward movement of shaft 354 in cylinder 350 the chain 499 is moved by the action or air cylinder 350 of the conveyor to move the chain 499 against the resilient action of spring 506, whereupon, the pawl arm 502 is attached to sprocket 500 and with a pawl 503 pivotally mounted on pawl arm 502, and with a torsion spring 507 acting to seat the pawl 503 between pawl teeth 509, the pawl gear 504 is rotated in unison with the sprocket, and with the pawl gear 504 fixedly secured to shaft 501, the shaft 501 and a conventional pulley 505 are rotated in unison to move the conventional belt 312 in the direction indicated by the arrows, FIGS. 21, 28 and 30, and with each reciprocation of shaft 354 in cylinder 350, the belt will be moved a predetermined distance, in accordance with the cylinder stroke, the diameter of the sprocket, and the diameter of the conventional pulley 505.

It will be seen, that by this arrangement, the conveyor 230 will operate only when the sausage machine is operating, and then, it will move only to the extent required to move the sausage away from the molding machine 210.

*Operation of the alternate form of sausage molding machine*

In a simplified description of the operation of the alternate form of sausage molding machine, air pressure is introduced into the air circuits of the machine through air supply inlet connection 316 into a main air control valve 317 which valve is of the slide type to start, stop and bleed the air conduit 330, where it flows into the valves and cylinders so as to position them to operate in the proper sequence to mold, eject and convey skinless sausages, as will be hereinafter described.

Sausage material is loaded into sausage stuffer 220, which sausage material is sealed inside the stuffer 220 by clamping stuffer closure lid 319 into place, and then introducing air pressure into sausage stuffer 220 through air inlet line 320 (FIG. 21). The air then exerts pressure on a movable piston (not shown) in stuffer 220 to place the sausage material under fluid pressure. The sausage material is then introduced into the sausage molding machine, designated generally at 210 by opening sausage stuffer outlet control valve 321, which allows the sausage material to flow, under fluid pressure, into sausage inlet supply piping 322 (FIG. 28) through sausage outlet L 323 into sausage supply manifold opening 324 and into sausage inlet manifold 459 and into arcuately movable sausage inlet valve member 305.

Each complete operation of the machine is broken down into two individual and interconnected cycles. The cycles can be described as the molding cycle and the ejection cycle.

The molding cycle is broken down into the following basic steps:

*Step 1.*—Moving the sausage ejection pistons 301 rearwardly inside the molding cylinders 302 to create a partial vacuum inside the respective cylinder cavities 303 and to move the pistons 301 to a point rearward of the inlet orifices 304.

*Step 2.*—Opening the arcuately movable sausage inlet valve member 305, as shown in FIG. 28, to allow sausage material, under pressure, to flow from sausage inlet supply piping 322 into the respective cavities 303.

*Step 3.*—Allowing the force of the flowing sausage, under fluid pressure, to move the pistons 301 rearwardly, thereby extending the cavities 303 to a point where the sausage material has been molded to a predetermined, adjusted length and density; and

*Step 4.*—Arcuately moving the sausage inlet valve member 305 to close inlet orifices 304 to stop the flow of sausage into the cavities 303.

The ejection cycle is broken down into the following basic steps:

*Step 1.*—Moving the mold cylinder closure pistons 279 outwardly, out of contact, with the molded sausages, to allow for expansion of the molded sausages within the cavities 303, and, in continuous outward movement, moving the closure pistons 279 out of cylinder block 272 to a point where they will remain out of contact with the sausages.

*Step 2.*—Moving the ejection pistons 300 outwardly to a point where the molded sausages have been ejected from the cavity 303 in the cylinder block 272.

*Step 3.*—Moving the cutter blade 311 downwardly to discharge the molded sausages 231 from the faces of pistons 301 and depositing them onto conveyor belt 312, of conveyor 230, which, at this phase, is idle, then moving the cutter blade 311 to the uppermost position thereof.

*Step 4.*—Moving the closure pistons 279 inwardly to the point where they come into contact with the adjacent faces of pistons 301, and, in continuous movement, force pistons 301 inwardly into sealed relation with closure pistons 279, which pistons 279 move into sausage molding cylinders 302, thereby forming a sealed closure in the forward ends of cylinders 302.

*Step 5.*—Moving the conveyor belt 312 outwardly for a spaced distance, to move the ejected sausages 231 away from the machine.

*Step 6.*—Compressing any residue of sausage, which may have collected on any of the above mentioned parts during the ejection cycle, forcing this residue to flow through the interstices 313 in piston closure block 314 into the residue pan 276.

At this point the machine automatically initiates the molding cycle to repeat the operation described above. Some of the steps described occur in the sequence mentioned, while some of them occur simultaneously, as will be brought out in the following detailed description.

To prepare the machine for operation, an air supply line is connected to an air supply inlet connection 316. Air then flows into main air control valve 317, which is shown in detail in FIG. 45. Air flows into air filter 334 and into air pressure regulator 335. The speed of operation of the machine can be controlled, to some extent, by increasing or decreasing the operating pressure. However, the pressure of the air must be maintained at a high enough pressure to withstand the force of the sausage pressure exerted against the surfaces of the closure pistons 279. Since the terminal pressure of the sausages in the molding cylinders has been found to be between forty and fifty p.s.i., the operating pressure, acting together with the area of the piston surface, in the main air cylinder 280, has to be of sufficient magnitude to remain above the combined pressure exerted against closure pistons 279. Therefore, an operating pressure between 130 and 160 p.s.i. is maintained in the machine, while the diameter of the piston in the main air cylinder 280 must be sized according to the number of molding cylinders in the machine.

The air then passes through air lubricator 336, through flexible air line 340, where it is connected to the machine at the air inlet fitting 337. The air supply inlet connection 316 is connected to the main air control valve 317, which, in the present instance, is shown to be a slide valve, however, the valve is of the character to stop and start the molding machine, and to bleed the air therefrom, which valve is conventional. The air supply is preferably located remote from the molding machine and directs air into an air line or conduit 330, through air filter 334, into and through air regulator 335 and through an air lubricator 336, all of which are located remote from the molding machine, and a flexible air line 340 connects with the air inlet connection 337, which flexible air line leads to the air supply line 355, which is connected to the air supply line of the stuffer 220 so as to be readily accessible, and the air line 340 may be of flexible material, with conventional couplings to connect the air line 340 with the sausage molding machine. This allows the mechanism to be readily disconnected from the air supply for cleaning and sterilization.

After the machine is assembled, or after service operations, it is sometimes necessary to manually bleed one or more of the bleeder valves 341, 342, 343, or 344, in order to place the mechanism in the proper timed sequence. Once this is done, the mechanism will always follow the operational pattern as will be described hereinafter. Even though the main air control valve 317 is opened, which will cause air to exhaust from the machine before the cycle is completed, as soon as air pressure is reinstated, the molding mechanism will resume the sequence, completing the interrupted cycle. This is effected by the positioning of the spools in the reversing valves, as will be set out hereinafter. After air pressure has been introduced into the machine, and the machine has completed any interrupted cycle, it will come to rest and will not operate until stuffer valve 321 is opened to allow sausage material to flow into the molding machine. Once sausage material begins flowing into the machine, the molding operation will be started, and forty to sixty molding cycles per minute will be completed, depending on the texture and fluidity of the material. The machine will continue to operate until it has molded all the sausage material contained within the stuffer 220, or until the stuffer valve 321 is closed. If the stuffer valve 321 is closed while the machine is in operation, the machine will complete the cycle it is in, and then it will stop, therefore, it will always be positioned properly to start the succeeding operation, when sausage pressure is reinstated. When all the sausage material in the stuffer 220 has been discharged into the sausage molding machine, the machine will stop at the end of a completed operation, because a sausage pressure is necessary to initiate the following cycle. The speed of operation of the machine can be controlled by opening the stuffer valve 321 to its full open position for the fastest operation, or the speed can be reduced by throttling the stuffer valve 321.

To illustrate one complete operation of the machine, it will be assumed that carriage 244, FIGS. 28 and 29, is moving rearwardly to terminate the preceding ejection cycle. As carriage 244 approaches the rearmost position thereof, as shown in FIGS. 28 and 29, the adjusting contact screw 434 comes into contact with the movable head 433 of recycling bleeder valve 344, FIGS. 43 and 46. The head 433 is held rigidly in place by air pressure exerted against the inner surface thereof inside cavity 395 of valve 344, which air is supplied from air line 331, FIG. 40, passes through orifice 402 of valve 346, through annular passage 405 of valve 346, through right hand bleeder orifice 410 of valve 346, through right hand bleeder cavity 412 of valve 346, through air line 368, through cavity 391, FIG. 43, through passage 394 into cavity 395 of valve 344. Further rearward movement of carriage 244 causes adjusting contact screw 343 on cross arm 288 to depress head 433, thereby moving it inwardly against the tension of spring 426 to move the seat 461 of valve 344 away from the sealing relation with valve body 462 of recycling valve 344, so when carriage 244 has reached the rearmost position, annular recess 392 of valve member 460 is brought into position where air pressure in cavity 391 or recycling valve 344 can flow through recess 392, through chamber 463 of valve 344, and through exhaust orifices 392 of valve 344 to atmosphere. This action exhausts air pressure from the right bleeder cavity 412 of reversing valve 345, FIG. 40, so that air pressure from air line 331, flowing through orifice 403 in valve 346, annular passage 405 of valve 346 and left bleeder orifice 409 of reversing valve 346 and cavity 411, FIG. 40, to create a force against the left hand end of spool 464 in reversing valve 346, thereby moving this valve to the right, as shown in FIG. 40. At the same time, air flows from cavity 411, through bleeder line 367 into valve mounting block 308, charging valve 343, for subsequent use. When the air pressure is exhausted from cavities 395 and 391 in recycling valve 344, the head 433 loses the rigid control of valve member 460 so that spring 426 moves valve member 460 into interfitting relation within cavity 395 of valve 344, thereby moving valve seat 461 back into sealed relation with valve body 462 to prevent further exhausting of air through this valve, so that the head 433 can remain depressed throughout the succeeding cycle, without bleeding air pressure from cavity 412 in reversing valve 346. However, air pressure will flow from air line 331, through annular passage 405, of valve 346, through orifice 410 into cavity 412 to prepare the valve 346 for the next reversing cycle, and at the same time, air flows into bleeder line 368 of valve 344 into cavity 391 thereof and into air passage 394 of the recycling bleeder valve 344, so that, when carriage 244, with contact screw 434 subsequently moves away from contact with head 433, air pressure flows into cavity 395 of valve 344, thereby forcing the cavity of the head 433 to move out of interfitting relation with valve member 460, and in so doing, head 433 regains rigid control of valve member 460, so the next time it is depressed it will again cause a momentary exhausting of air from air line 368 and cavity 412, as described above.

When the spool 464 in reversing valve 346, FIG. 40, is moved to the right hand position, air is caused to flow from air line 331, through orifice 402 of valve 346, through annular passage 405, through orifice 408, through air line 364 into the shaft end of sausage ejector piston retractor air cylinder 294. At the same time, air pressure in sausage ejector piston retractor cylinder 294 is behind piston 295 passes through air line 363, through orifice 407, through annular passage 404, through orifice 401, through air line 370, through exhaust manifold and muffler 465, through outlet 374 to atmosphere. This action forces the piston 295 to move inwardly inside cylinder 294.

As shown in FIGS. 28, 29, and 37, the shaft 296 of sausage ejector piston retractor air cylinder 294 is attached to cross member 300 by a nut 298, FIG. 28. Cross member 300 is then attached to resilient, rear slide blocks 450 and rods 467 by means of bolts 451, FIG. 29. As the shaft 296 in air cylinder 294 moves inwardly, it carries cross member 300 rearwardly, thereby causing slide blocks 450 to move against transverse, piston rod retainer blocks 262 to move ejection pistons 301, mounted on piston rods 264, inwardly inside sausage molding cylinders 302, so that, when piston 295, in air cylinder 294, reaches the retracted position thereof, sausage ejecting pistons 301 have been moved to a point behind sausage inlet orifices 304 of the mold cavities, and have created a partial vacuum inside the cavities 303 between the faces of piston 301 and closure pistons 279, as shown in FIG. 28. This action completes step No. 1 of the molding cycle, as outlined above.

In conjunction with Step 1, as piston 295, in air cylinder 294 moves inwardly, it moves rack movement rods 467 rearwardly, thereby moving slide rods 454 in the openings 458 formed in the forward end of the slide blocks 456, until heads 455 thereof come into contact with internal shoulders 468 of slide blocks 456. Further rearward movement of piston 295 in air cylinder 294, moves slide blocks 456 rearwardly, which movement causes racks 457 to turn gears 439 in a counter-clockwise motion, which gears 439 are fixedly attached to shafts 440, as by set screws or the like, which shafts are inserted in bearings 441 are attached by pins 443, to turning members 442, which causes vanes 469 thereon to work within the slotted opening 470 of valve member 305. The arcuate movement of vanes 469 moves the valve member 305 into open position, as shown in FIGS. 25 and 30, so sausage material will flow out of the inlet manifold block 459, through orifices 304 into vacuumized cavities 303, in sausage molding cylinders 302, which action completes Step 2 of the molding cycle.

Slide rods 454 are threaded into the ends of rack movement rods 467 and may be adjusted to lengthen or shorten the arc of rotation of gears 439, such rotation being dependent on the size of the molding cylinder and/or the diameter of the inlet orifices 304.

As sausage, under fluid pressure, flows from stuffer 220, through sausage inlet pipe 322, through manifold block 459 into molding cavities 303, it creates a pressure against the faces of pistons 301, which causes them to move rearwardly inside the molding cylinders 302. As the sausage ejector pistons 301 move rearwardly, piston rod retainer blocks 262 move into contact with arm 307 of the mounting block 308 of bleeder valve 343. When sufficient sausage pressure has been created within molding cavities 303 against the faces of sausage ejector pistons 301 to overcome the force of spring 418, which spring is biased between the mounting block 308 of bleeder valve 343 and sausage compression adjustment screw 448, bleeder valve 343 moves rearwardly along slide rods 424 until bleeder button 419 thereof, FIGS. 28, 44, and 46, comes into contact with length adjustment screw 449. This action completes Step 3 of the molding cycle, as outlined above.

The terminal density of the sausage can be controlled by screwing adjustment screw 448 inward, thereby increasing the force of the spring pressure of spring 418, or, by screwing the adjustment screw 448, outward, the pressure of the spring 418 is decreased. The length of the sausage can be decreased by screwing the length control screw 449 inward, or the length of the sausage may be increased by screwing the length control screw 449 outward, which screw regulates the terminal travel of the bleeder button 419 of bleeder valve 343.

When bleeder button 419 in bleeder valve 343, FIG. 44, is depressed, it moves valve member 423 of valve 343 out of contact with the valve seat 471 in bleeder valve 343. This allows air to flow out of cavity 411 in reversing valve 346, through air bleeder line 367 into button bleeder valve mounting block 308, through passageway 473, in the body of valve 343, where it is exhausted through port 420 to atmosphere. Air pressure previously charged into cavity 412 of valve 346, FIG. 40, works against the right hand end of spool 464 to force the spool to move to its extreme left hand position. This allows air in the shaft end of air cylinder 294, FIG. 46, to flow outwardly through air line 364, through orifice 408, in reversing valve 346, FIG. 40, through annular passage 406, through orifice 403, through air line 369, through exhaust manifold and muffler 465, through outlet 374 to atmosphere. Simultaneously, air flows through line 331, through orifice 402, in reversing valve 346, through annular passage 405, through orifice 407, through air line 363, into the rear end of sausage ejector piston retractor air cylinder 294. This air pressure causes piston 295 in cylinder 294 to move outwardly, so that shaft 296 moves cross member 300 forwardly, moving rear slide blocks 450 forwardly, thereby carrying rack movement rods 467 forwardly until set collars 453 move into contact with slide blocks 456. Further forward movement of slide blocks 456 causes racks 457 to move in meshed relation to rotate gears 439 in a clockwise motion, and moving the sealing surface of arcuately movable sausage inlet valve member 305, to cover the inlet orifices 304 into the cavities 303 of the mold cylinders 302. Valve sealing member 305 is made of resilient substance, such as Teflon, so that the pressure of the sausage material working against the inner face of valve member 305 causes it to yield to make a tight closure with the bore of sausage inlet manifold 324 to seal orifices 304 to prevent further passage of sausage material into the mold cavities 305. This action completes Step 4 of the molding cycle and completes the entire molding cycle, as outlined above.

In conjunction with Step 4 of the molding cycle, a cross member 300 approaches its foremost position, it carries adjusting contact screw 446, FIG. 29, into contact with head 437 of recycling bleeder valve 341, FIGS. 42 and 46. This recycling bleeder valve 341 is identical in structure with recycling valve 344. Air pressure is present inside cavity 400, of valve 341, in head 437, having previously flowed from air line 333, through orifice 376, in reversing valve 345, FIG. 38, through annular passage 379, through orifice 383, through cavity 413, through air bleeder line 365, through cavity 396, of valve 341, FIG. 42, through passage 399, into cavity 400 in head 437. This air pressure gives head 437 rigid control over valve member 477, so when head 437 is depressed, valve member 477 is moved inwardly against the tension of spring 398 to move the valve seat 474 out of sealing relation with valve body 478 of valve 341, so when cross member 300 has reached the forwardmost position thereof, annular recess 397, in valve 341, is brought into a position to allow air to flow from cavity 413, FIG. 38, in reversing valve 345, through air bleeder line 365, through cavity 396, of recycling valve 341, through annular recess 397, through chamber 476 and through exhaust ports 475 to atmosphere. Simultaneously, air has been exhausted from cavity 400 of head 437, through passage 399, through cavity 396, through annular recess 397, through chamber 476, and through ports 475 to atmosphere, which causes the action of spring 398 to force valve member 477 to move outwardly into interfitting relation in cavity 400 and bringing valve seat 474 into sealing relation with valve body 478, of valve 341. This action prevents further bleeding of air through valve 341, and allows head 437 to remain depressed throughout the succeeding cycle. However, with the valve seat 474 seated against valve body 478 of valve 341, air will flow through air line 333, in reversing valve 345, through orifice 376, through annular passage 379, through orifice 383, through cavity 413, through bleeder air line 365, through cavity 396 of valve 341, and into passage 399, so that, when cross member 300 and contact screw 446 subsequently move out of contact with head 437 of valve 341, air pressure will flow into cavity 400 of head 437, thereby moving the head 437 outwardly to cause this head to regain rigid control of valve member 477, resetting valve 341 for bleeding action in the succeeding cycle.

When the air pressure in cavity 413, in reversing valve 345, FIG. 38, has been momentarily reduced, by the action of valve 341, air pressure in cavity 414 will force spool 479 to move to its extreme left hand position. The air pressure in cavity 414 has been previously introduced through air line 333, flowing through orifice 376, through annular passage 379 through orifice 384, into cavity 414, and through air bleeder line 366 into mounting block 445 of button bleeder valve 342, FIG. 41.

When the spool 479, in reversing valve 345, FIG. 38, moves to the left, air is allowed to flow from the shaft end of the main cylinder 280 into branch air line 360 and into air line 358. Simultaneously, air flows from the shaft end of cylinder 348 into air line 359 and into air line 358, and air flows from the shaft end of conveyor cylinder 350 into branch air line 361 and into air line 358. Air pressure flows from air line 358, through orifice 382, in reversing valve 345, FIG. 38, through annular passage 380, through orifice 377, through air line 372, through exhaust manifold and muffler 465, and through outlet 374 to atmosphere. This action exhausts air pressure from the shaft end of air actuated cylinders 280, 348, and 350. At the same time air pressure, from air line 333, flows through orifice 376, in reversing valve 345, through annular passage 379, through orifice 381, through air line 356 into branch line 481 into the rear end of cylinder 280, and through branch line 357 into the rear end of cylinder 350. This action institutes the ejection cycle.

As air pressure flows into the rear end of cylinder 280, the piston 339 in cylinder 280 is moved forward, and shaft 284, which is secured to cross bar member 286, of carriage 244, FIG. 28, by nut 482, moves carriage 244 forward, thereby causing the rollers 246 of carriage 244 to move along trackways 242, FIG. 29. Connecting rods 260, which are attached to legs 248 of carriage 244 by nuts 429, are caused to move forwardly, passing through bearings 270 in piston rod retainer blocks 262, through openings 484, FIG. 33, in sausage molding cylinder block 272, which rods are attached to closure piston block 278, in which block mold cylinder closure pistons 279 are detachably mounted, with a screw threaded rod 432 passing through a longitudinal hole in block 278 and through transverse holes, formed through mold cylinder closure pistons 279, to retain the pistons 279 within holes 313a, which holes 313a are interconnected by interstices 313. A retainer nut 233 is screw threaded into each end of rod 432.

Upon forward movement of connecting rods 260, the piston closure block 278, and the closure pistons 279 will be moved forward with respect to molding cylinders 302, which will allow the pressure on the molded sausages to be reduced to substantially atmospheric pressure, thereby allowing the sausage within the molding cylinders 302 to expand. The closure pistons are designed with a critical length, so that, at just the moment O-rings 488, FIGS. 28, 33, and 34, move out of a sealed relation with the inside surfaces of molding cylinders 302, the sausage has reached its maximum expansion, and the pressure thereon has been reduced to atmospheric pressure. Further forward movement of connecting rods 260 moves the closure pistons 279 out of contact with the molded sausages, and moves them away from the face of cylinder block 272. As the legs 248 of the carriage 244, FIGS. 29 and 30, move forwardly, they come into contact with the bearing shoulders 489, FIG. 29, of bearings 270 of piston rod retainer blocks 262. Further forward movement of carriage 244 will force pistons 301 forward, thereby causing the molded sausages to be moved outwardly from within the cylinders 302. The spacing from the point where the carriage 244 began to move forward to move the closure pistons 279 outwardly, to the point where the carriage legs 248 come into contact with the bearings 270 in block 262, will vary with the length control setting effected by adjustment screw 449. However, the machine is so designed that this spacing will always be sufficient to prevent the ejected sausages from coming into contact with the closure pistons 279, which continue to move ahead of the sausage being ejected. As carriage 244 approaches the end of its forward movement, cross bar 286, FIG. 28, comes into contact with arm 436 of spring return, three-way valve 347, FIG. 28, thereby moving the arm 436 forwardly. Just at the moment the carriage 244 has reached the termination of the forward movement thereof, ejection pistons 301 have moved forwardly through the entire length of the sausage molding cylinders 302, and have emerged, with the faces of pistons 301 having emerged from the forward, external end of cylinder block 272, and being in vertical alignment with the back surface of cutter blade 311. This has completed Steps 1 and 2 of the ejection cycle, as outlined above.

The sausages have been compressed during the molding cycle, to the point where they retain their shape and bear their own weight, in a horizontal line, as they are ejected outward from the mold cylinders 302, while adhering to the faces of the ejection pistons 301, with closure pistons 279 being a spaced distance ahead of the ejected sausages, and since the sausage molding cylinders or cylinder segments are bored in such manner and fixedly secured within sausage molding cylinder block 272 that the cavities 303 interconnect laterally, by longitudinal slots 303a one with another, therefore the sausages emerge as a unitary mass, being joined by pressure along chordal intersections along the elongated round faces. However, since the space of interconnected between cylinders is comparatively small, FIG. 25, the individual sausages are virtually cylindrical in shape, and since each sausage is formed from fibrous sausage material flowing individually into each mold cavity through a separate inlet orifice, the molded sausages emerge from the molds joined only by a compressed thin web of fibers, with minimum of intertwined lateral fibers, and can be easily separated, even when frozen.

Operation of conveyor

When air pressure is directed into the back end of the air cylinder 350 of the conveyor, it forces the piston 480 outward. Shaft 354 of cylinder 350, FIGS. 28 and 46, is attached to roller chain 499, which passes around sprocket 500 and is attached to a spring 506, as shown in FIG. 28, sprocket 499 moves freely on shaft 501. Pawl arm 502 is fixedly secured to the inner hub of sprocket 500 and carries pawl 503, which is engaged with teeth 509 of ratchet gear 504, by means of a torsion spring 507. The ratchet gear 504 is attachably connected to shaft 501 by conventional means such as a set screw and key (not shown). The drum 505 is also fixedly secured to shaft 201, in a manner well understood in the art, as by set screws, keys, and the like. As shaft 354 moves outwardly, chain 499 moves sprocket 500, FIG. 28, in a counterclockwise rotation, the chain 499 being held firmly in place on sprocket 500 by a tension spring 506. This action causes pawl 503 to ratchet over teeth 509 of ratchet gear 504, thereby resetting pawl 503 for subsequent movement, but imparting no movement to shaft 501 or to drum 505, so that the conveyor belt 312 remains idle during this operation.

At this point arm 436 of valve 347 has been moved to the forward position, as shown in dotted outline in FIG. 46. This action moves the spool 490 of valve 347, FIG. 39, inwardly, to allow air to flow from air supply line 332, FIG. 39, through orifice 389, through annular passage 386, through orifice 387, through air line 362 into the back end of cylinder 348, FIG. 46. This air pressure forces piston 491 in cylinder 348 to move forwardly. Shaft 352 is threaded into cutter blade block 492, and is secured with nut 494, FIGS. 23, 24. As piston 491, in cylinder 348, moves forwardly, the blade 311 is moved downward through blade guides 495, secured to manifold block 459 by blade guide block 496 and is bolted thereto by bolts 497, FIG. 30. Further movement of blade 311 moves it across the faces of ejection pistons 301, which action severs the sausages from the pistons 301, whereupon, the sausages fall onto the conveyor belt 312, which, at this precise moment, is not moving.

Operation of sausage cutter mechanism

As the cutter blade block 492 moves downwardly, it carries contact arm 498 downward, so, when cutter blade 311 has reached its terminal downward position, contact arm 493 has come into contact with button 415, of bleeder valve 342, which valve is screwed into the mounting block 445 of bleeder valve 342, FIG. 41. This action has depressed button 415 to move valve member 417 of valve 342 away from the valve seat thereof. This allows air pressure from cavity 414, in reversing valve 345, FIG. 38, to pass through air line 366, through block 445, through passage 427 and port 390 to atmosphere. The reduction of pressure in cavity 414 allows air pressure in cavity 413, previously introduced, to act upon spool 479 of valve 345, to move the valve spool 479 to the extreme right hand position, as shown in FIG. 38. Air pressure will now flow from the rear of main cylinder 280, through air line 481 and into air line 356, and air pressure will flow from the rear end of cylinder 350, through air line 357 into air line 356, FIG. 46. Air flows through air line 356, through orifice 381, in reversing valve 345, FIG. 38, through annular passage 378, through orifice 375, through air line 373, through exhaust manifold and muffler 465, and through outlet 374 to atmosphere. At the same time air will flow from air line 333, through orifice 376, in reversing valve 345, FIG. 38, through annular passage 379, through orifice 382, into air line 358, then through branch air line 359 into the shaft end of cutter cylinder 348. Air also flows from air line 358 through branch line 360 into the shaft end of main cylinder 280, FIG. 46.

Air pressure which flows from air line 360 into the shaft end of main air cylinder 280 causes the piston 339 therein to move rearwardly. This starts a rearward movement of carriage 244 which causes a rearward movement of mold cylinder closure pistons 279. As carriage 244 moves rearwardly, the crossbar 286 is moved out of contact with arm 436 of three-way valve 347. The action of spring 510, FIG. 39, moves spool 490 of valve 347 outwardly to the left hand position thereof, as shown in FIG. 39. This action allows air to flow from the rear end of cutter cylinder 348, FIG. 46, through air line 362, through orifice 387, FIG. 39, through annular passage 385, through orifice 388, through air line 371, through exhaust manifold and muffler 465, through outlet 374 to atmosphere. The manifold outlet pipe 374 has been shown broken away and shortened in FIG. 46, however it may be extended to a point outside of the food processing area as may be required by Government regulations.

Upon the release of air pressure from the rear of cutter cylinder 348, through air line 362, air pressure, which is already present in air line 359, flows into the shaft end of cutter cylinder 348, thereby retracting piston 491 rearwardly and moving the cutter blade 311 upwardly into its retracted position, as shown in FIG. 28. This action completes Step 3 of the ejection cycle as outlined above.

*General operation*

As the carriage 244 moves rearwardly, the closure pistons 279 are moved rearwardly, and, as the closure pistons 279 approach face of sausage molding cylinder block 272, closure pistons 279 are moved into abutting contact relation with the faces of sausage ejection pistons 301. Further rearward movement of carriage 244 causes closure pistons 279 to force sausage ejection pistons 301 rearwardly into sausage molding cylinders 302, so that when carriage 244 has reached the terminal rearward position, both sets of pistons, 301 and 279 are in sealed, abutting relation within sausage moulding cylinders 302, by the resilient sealing action of O-rings 511, on pistons 301, and the sealing action of O-rings 488 on pistons 279. This action terminates Step 4 of the ejection cycle.

When air flows from air line 361 into the shaft end of conveyor cylinder 350, FIGS. 28 and 46, the piston 480 and shaft 354 are retracted. This action causes chain 499, FIG. 28, to move lineally to rotate sprocket 200, complementally engaged therewith, in a clockwise direction. This action allows pawl 503 to engage teeth 509 of ratchet gear 504, thereby to impart turning movement to ratchet gear 504, to shaft 501, drum 505, to move conveyor belt 312 of conveyor 330 outwardly a spaced distance from the sausage molding machine 210, while carrying the ejected sausages 231 away from the machine, as shown in dashed outline in FIG. 21. The length of travel of conveyor belt 312 is determined by the length of the stroke of piston 480 in conveyor cylinder 350, the diameter of sprocket 500 and the diameter of the drum 505, the dimensions of any or all of these elements may be varied to adjust the linear movement of the conveyor belt 312. This action terminates Step 5 of the ejection cycle.

As the carriage 244 approaches its rearward terminal position, the closure piston block 278 is carried rearward, FIGS. 33 and 34, so that, as block 278 passes beneath blade guide block 496 and blade guides 495, a wiping action is imparted to blade guide block 496 and of blade guides 495, so that any sausage residue, remaining of these parts during the ejection cycle, will be wiped off, as block 278 reaches its inner-most position, FIG. 28. As the block 278 reaches the inner-most position thereof, FIG. 28, lipped extension 513 comes into interfitting contact with block 514, which has a beveled outer surface, which bevel is formed at the same angle as the angle on extension 513, and is attached to the underside of the structural frame 212 of the sausage molding machine 210 by means of bolts 515 which pass through resilient members 516, which causes the lipped extension 515 of block 278 to lift slightly, thereby making an extremely close contact between lipped extension 513 and the underside of sausage mold cylinder block 272, which action causes any sausage material present on lipped extension 513 to be squeezed outward into recess 512. At the same time the inner faces 517 of block 278 are brought into extremely close contact with the forward face of sausage mold cylinder block 272, so that the residue sausage which accumulates during this wiping process is compressed in recess 512 of block 278 and is forced to flow outwardly through interstices or slots 313 of block 278 into residue pan 276, where it can be collected for reuse. This completes Step 6 of the ejection cycle and completes the ejection cycle of the operation.

As the carriage 244 approaches the rear-most position thereof, FIG. 28, adjustment screw 434 comes into contact with head 433, of recycling valve 344, and as the carriage 244 reaches the rear-most position, as shown in FIG. 28, head 433 is depressed to the point where a momentary exhausting of air is effected in cavity 412 of reversing valve 346, FIG. 40, to move spool 464 thereof to the left, which procedure was described at the beginning of this portion of the operational procedure. This action reinstitutes the molding cycle, to repeat the operations in the sequence, as described above.

It can be seen from the foregoing description, that the operation of the machine will follow a prescribed operational cycle, continuously, with the bleeding of air from button bleeder charging valve 343 being the trigger, valve 343 being actuated by the rearward movement of piston rod retainer block 262, which rearward movement is, in turn, actuated by the presence of sufficient sausage material pressure inside molding cavities 303, in mold cylinder 302 so, if the stuffer valve 321, FIG. 21, is turned off, or if the sausage load in stuffer 220, is exhausted, the sausage molding machine mechanism will come to a standstill, since the fluid sausage pressure necessary to actuate valve 343 will not be developed. Also, that, when sausage pressure is reinstated in molding cavities 303, the operating sequence will be resumed by actuating bleeder valve 343.

It can also be seen that if the air supply to the machine is interrupted, during any part of the cycle, the cycle will be resumed at the point of interruption, when air pressure is reinstated by the prior positioning of spool 464 in reversing valve 346, spool 479 in reversing valve 345 and spool 490 in three-way valve 347.

Having thus clearly shown and described the invention, what as claimed as new and desired to be secured by Letters Patent is:

1. A skinless sausage molding machine, which machine comprises;
   (a) a frame,
   (b) a cylinder block mounted on said frame,
      (1) said cylinder block having a plurality of elongated mold cylinders formed therein,
      (2) a sausage material inlet port formed in each said mold cylinder intermediate the length thereof,
   (c) a piston mounted in each said mold cylinder,
   (d) mold cylinder closure members,
   (e) a fluid actuated cylinder mounted on said frame,
   (f) associated means interconnecting said fluid actuated cylinder and said closure members to selectively close said mold cylinders in co-ordinated relation with said pistons,
   (g) associated means interconnecting said fluid actuated cylinder and said pistons,
   (h) a sausage material supply pipe,
      (1) parti-cylindrical valve means associated with said sausage material supply pipe to admit sausage material, under pressure, through said ports into said sausage mold cylinders, (2) actuator means associated with said parti-cylindrical valve means to open and close said valve, and
(i) valve means to selectively direct fluid under pressure to said fluid actuated cylinder to move said pistons to eject molded sausage from said mold cylinders.

2. A skinless sausage molding machine, which machine comprises;
(a) a frame,
(b) a cylinder block mounted on said frame,
 (1) said cylinder block having a plurality of elongated mold cylinder tubes mounted therein,
 (2) a sausage material inlet port formed in each said mold cylinder tube intermediate the length thereof,
(c) a piston mounted in each said mold cylinder tube,
 (1) a piston rod on each said piston,
(d) cylinder tube closure members,
(e) a fluid actuated cylinder mounted on said frame,
(f) associated means interconnecting said fluid actuated cylinder and said closure members to selectively close said mold cylinder tubes in co-ordinated relation with said pistons,
(g) associated means interconnecting said fluid actuated cylinder and said piston rods,
(h) a sausage material supply pipe,
 (1) parti-cylindrical valve means associated with said sausage material supply pipe to admit sausage material, under pressure, through said ports into said sausage mold cylinder tubes,
 (2) actuator means associated with said parti-cylindrical valve means to open and close said valve, and
(i) valve means to selectively direct fluid under pressure to said fluid actuated cylinder to move said pistons to eject molded sausage from said mold cylinder tubes.

3. A skinless sausage molding machine, which machine comprises;
(a) a frame,
(b) a cylinder block mounted on said frame,
 (1) said cylinder block having a plurality of elongated mold cylinders formed therein,
 (2) said cylinder block having a transverse bore formed therein at a right angle to said mold cylinders,
 (3) a sausage material inlet port formed in each said mold cylinder intermediate the length thereof and being in fluid communication with said transverse bore in said cylinder block,
(c) a piston mounted in each said mold cylinder,
 (1) a piston rod on each said piston,
(d) mold cylinder closure members,
(e) a first fluid actuated cylinder mounted on said frame,
(f) associated means interconnecting said first fluid actuated cylinder and said closure members to selectively close said mold cylinders in co-ordinated relation with said pistons,
(g) associated means interconnecting said first fluid actuated cylinder and said piston rods,
(h) a sausage material supply pipe,
 (1) a parti-cylindrical valve means mounted in said transverse bore in said cylinder block for arcuate movement to selectively open and close said inlet ports into said mold cylinders,
 (2) a second fluid actuated cylinder operatively associated with said parti-cylindrical valve to selectively actuate said parti-cylindrical valve,
  (i) a control valve associated with said second fluid actuated cylinder to selectively direct fluid under pressure thereinto,
(i) said sausage material supply pipe being connected in fluid communication with said transverse bore in said cylinder block to admit sausage material, under pressure, through said ports into said sausage mold cylinders, and
(j) valve means associated with said first fluid actuated cylinder to selectively direct fluid under pressure to said first fluid actuated cylinder to move said pistons to eject molded sausage from said mold cylinders.

4. A skinless sausage molding machine, as defined in claim 3; wherein
(a) stuffer valve positioned within said sausage supply pipe leading to said transverse bore in said cylinder block,
 (1) a third fluid actuated cylinder associated with said stuffer valve in operative relation, and
 (2) automatic valve control means to simultaneously actuate said second fluid actuated cylinder and said third fluid actuated cylinder to control said parti-cylindrical valve and said stuffer valve simultaneously.

5. A skinless sausage molding machine, which machine comprises;
(a) a frame,
(b) a cylinder block mounted on said frame,
 (1) said cylinder block having a plurality of elongated mold cylinders formed therein,
 (2) a sausage material inlet port formed in each said mold cylinder intermediate the length thereof,
 (3) a first fluid cylinder mounted on said frame,
  (i) a plunger mounted in said first fluid cylinder, which plunger is adapted to engage said cylinder block to impress pressure thereon, when fluid pressure is directed into said cylinder,
(c) a piston mounted in each said mold cylinder,
 (1) a piston rod on each said piston,
(d) mold cylinder closure members,
(e) a second fluid actuated cylinder mounted on said frame,
 (1) a fluid pressure line associated with said fluid system supplying pressure to said second fluid actuated cylinder to simultaneously apply pressure to said first fluid actuated cylinder to urge said plunger thereof into binding engagement with said cylinder block,
(f) associated means interconnecting said second fluid actuated cylinder and said closure members to selectively close said mold cylinders in co-ordinated relation with said pistons,
(g) associated means interconnecting said fluid actuated first cylinder and said piston rods,
(h) a sausage material supply pipe,
 (1) valve means associated with said sausage material supply pipe to admit sausage material, under pressure, through said ports into said sausage mold cylinders, and
(i) valve means to selectively direct fluid under pressure to said second fluid actuated cylinder to move said pistons to eject molded sausage from said mold cylinders.

6. A skinless sausage molding machine, which machine comprises;
(a) a frame,
(b) a cylinder block mounted on said frame,
 (1) said cylinder block having a plurality of elongated mold cylinders formed therein,
 (2) a sausage material inlet port formed in each said mold cylinder intermediate the length thereof,
(c) a piston mounted in each said mold cylinder,
 (1) a piston rod on each said piston,
(d) mold cylinder closure members,
 (1) sealing means associated with said closure members to form a fluid tight seal between the respective mold cylinders and the respective closure members,
(e) a fluid actuated cylinder mounted on said frame,
(f) associated means interconnecting said fluid actuated cylinder and said closure members to selectively close said mold cylinders in co-ordinated relation with said pistons,
(g) associated means interconnecting said fluid actuated cylinder and said piston rods,
(h) a sausage material supply pipe,
   (1) valve means associated with said sausage material supply pipe to admit sausage material, under pressure, through said ports into said sausage mold cylinders, and
(i) valve means to selectively direct fluid under pressure to said fluid actuated cylinder to move said pistons to eject molded sausage from said mold cylinders.

7. A skinless sausage molding machine, which machine comprises;
(a) a frame,
(b) a carriage movably associated with said frame,
(c) a unitary cylinder block having a plurality of mold cylinders formed therein, which cylinder block is mounted on said frame,
(d) a closure member closing an end of each said mold cylinder,
(e) a piston positioned in each said mold cylinder,
(f) a piston rod extending outward from each said piston and being connected to a common block member,
(g) means interconnecting said carriage and said closure members for co-ordinated lineal movement,
(h) said common block being in aligned relation with at least a portion of said longitudinally movable carriage to move said block with said carriage,
(i) a fluid actuated cylinder mounted on said frame and being interconnected with said movable carriage,
(j) said cylinder block having a transverse opening formed therethrough,
(k) said cylinder block having interconnecting openings formed between said transverse opening and said respective cylinders intermediate the length of said cylinders,
(l) a valve mounted within said transverse opening,
(m) a fluid actuated cylinder associated with said valve to selectively actuate said valve to close said openings,
(n) a sausage supply pipe connected with said valve,
(o) a stuffer valve within said supply pipe,
(p) a fluid actuated cylinder operatively associated with said stuffer supply valve to actuate said valve,
(q) fluid control valve means associated with said fluid actuated cylinders to simultaneously actuate said stuffer supply valve and said valve within said transverse opening in said cylinder block, and
(r) further valve connected in fluid communication with said first mentioned valves to actuate said cylinder to move said cylinder into a forward position so the distal end of said pistons, within said cylinders, will be in close communication with said closure members in the end of said cylinders.

8. A skinless sausage molding machine, which machine comprises;
(a) a frame,
(b) a cylinder block mounted on said frame,
   (1) said cylinder block having a plurality of elongated mold cylinders formed therein,
   (2) a sausage material inlet port formed in each mold cylinder,
(c) a piston mounted in each mold cylinder,
(d) mold cylinder closure members,
(e) a fluid actuated cylinder mounted on said frame,
(f) associated means interconnecting said fluid actuated cylinder and said closure members to close said mold cylinders,
(g) a second fluid actuated cylinder,
   (1) means interconnecting said second fluid actuated cylinder and said pistons of the respective mold cylinders,
(h) a sausage material supply pipe,
   (1) valve means associated with said sausage material supply pipe to admit sausage material, under pressure, into said sausage molding cylinders,
(i) a fluid supply pipe, and
   (1) valve means within said fluid supply pipe to direct fluid, under pressure, to move said first fluid actuated cylinder to move said pistons therein to eject molded sausage from said mold cylinders.

9. A skinless sausage molding machine as defined in claim 8; wherein
(a) means is provided to restrict the passage of air from said first cylinder and from said second cylinder.

10. A skinless sausage molding machine as defined in claim 1; wherein
(a) means is provided whereby said fluid from said fluid actuated cylinders is selectively restricted.

11. A skinless sausage molding machine as defined in claim 8; wherein
(a) said first cylinder and said second cylinder each has an air discharge line connected thereto,
   (1) each said discharge line having a flow-check valve therein, and
   (2) means whereby each flow-check valve can be adjusted independently to restrict the flow of air therethrough to control the movement of said first cylinder and of said second cylinder in either direction, independently of the movement of any plunger, or plungers, in any other movement of operation.

12. A skinless sausage machine as defined in claim 3; wherein
(a) resilient means is provided in the transverse bore of said cylinder block to urge said parti-cylindrical valve mounted therein laterally outward within the bore of said block.

13. A skinless sausage molding machine as defined in claim 3; wherein
(a) said sausage material supply pipe is connected in axial communication with a cylinder in which said parti-cylindrical valve is mounted, so as to admit sausage material in axially aligned relation into said valve.

14. A skinless sausage molding machine, which machine comprises;
(a) a frame,
(b) a cylinder block removably mounted on said frame,
   (1) said cylinder block having a plurality of elongated mold cylinders formed therein,
   (2) a sausage material inlet port formed in each mold cylinder intermediate the length thereof,
   (3) a piston movably mounted in each mold cylinder,
   (4) a mold cylinder closure member to close an end of each mold cylinder in fluid tight relation,
(c) means adapted to move said cylinder closure members to urge said members into sealing engagement with an end of each mold cylinder and into abutting relation with said respective pistons to move said pistons within said respective mold cylinders,
(d) further means adapted to move said pistons within said mold cylinders to create a partial vacuum in the respective mold cylinders and to open said sausage inlet ports,
(e) valve means associated with sausage inlet ports to direct sausage material, under pressure, into said mold cylinders, in which a partial vacuum has been created,
- (1) said sausage material adapted to be directed through said inlet ports in said mold cylinders to urge said pistons outward within said mold cylinders,
- (2) compression spring means associated with said pistons to restrain the outward movement of said pistons,
- (f) said valve means associated with said inlet ports adapted to be selectively closed upon movement of said pistons within said mold cylinders a predetermined distance against the compressive action of said spring means, and
- (g) means associated with said pistons to apply pressure to said pistons to move said pistons and said sausage material outward in unison with said mold cylinder closure members.

15. A skinless sausage molding machine, as defined in claim 1; wherein
- (a) said frame having an abutment thereon,
- (b) said cylinder block interengaging with said abutment to secure said cylinder block against relative, longitudinal movement, and
- (c) hold down means associated with said frame to detachably secure said cylinder block in a fixed relation with respect to said abutment on said frame when said hold down means is in one position.

16. A skinless sausage molding machine, as defined in claim 15; wherein
- (a) said hold down means is a fluid actuated cylinder.

17. A skinless sausage molding machine, as defined in claim 2; wherein
- (a) said cylinder block is formed of a resinous material, and
- (b) said elongated mold cylinder tubes mounted therein are stainless steel tubes fixedly secured therein.

18. A skinless sausage molding machine, as defined in claim 8; wherein
- (a) resilient member is associated with said pistons and said frame to control the density of sausage material admitted into said mold cylinders, and
- (b) screw means associated therewith to adjust the resistance of said resilient member.

19. A skinless sausage molding machine, as defined in claim 8; wherein
- (a) screw means associated with said frame and said pistons to adjust the length of said mold cylinder independently of the adjustment of the density of said sausage material.

20. A skinless sausage molding machine, as defined in claim 8; wherein
- (a) resilient means associated with said frame to retard the inward movement of said mold cylinder closure members.

21. A skinless sausage molding machine, as defined in claim 8; wherein
- (a) adjusting means associated with said frame to adjust the terminal point of said pistons in said mold cylinders.

22. A skinless sausage molding machine, as defined in claim 8; wherein
- (a) said mold cylinder closure members are cylindrical in shape,
- (b) said mold cylinder members each having a groove formed therein, and
- (c) an elastomer O-ring fitted within said groove and forming a seal with each cylinder when said closure members are in one position.

23. A skinless sausage molding machine, as defined in claim 8; wherein
- (a) said valve means associated with said sausage supply pipe to admit sausage material in a segmental valve,
  - (1) said sausage material adapted to feed axially thereinto,
  - (2) said sausage material outlet ports being positioned at a right angle to the incoming sausage material supply pipe,
- (b) a lever connected to said segmental valve to move said valve through a predetermined arcuate movement, and
- (c) a fluid actuated cylinder connected to said lever to actuate said valve in timed relation with the movement of said pistons in said cylinder.

24. A skinless sausage molding machine, which machine comprises:
- (a) a frame,
- (b) a block mounted on said frame,
  - (1) said block having a plurality of interconnecting, elongated mold cavities formed therein,
  - (2) a sausage material supply pipe,
    - (i) a sausage control valve in said sausage material supply pipe,
  - (3) a sausage inlet manifold mounted on said block and having a sausage inlet opening formed therein,
    - (i) said sausage material supply pipe being connected in fluid communication with said inlet opening in said sausage inlet manifold,
  - (4) said sausage inlet manifold being connected in fluid communication, by inlet ports, with each said mold cavity intermediate the length of the respective mold cavities,
  - (5) a valve member within said manifold to selectively open, and to selectively close the inlet ports to the mold cavities,
- (c) a piston mounted in each said mold cavity in said block in sealing relation therewith,
  - (1) a piston rod connected with each said piston,
    - (i) a transverse piston rod retainer block detachably connecting said piston rods for unitary movement,
- (d) a mold cavity closure member closing the outer and on each said mold cavity,
  - (1) sealing means associated with each said closure member to form a fluid tight seal between the respective mold cavities and said respective mold cavity closure members,
- (e) a fluid actuated cylinder mounted on said frame,
- (f) associated means interconnecting said fluid actuated cylinder and said closure members to selectively close said mold cavities in coordinated relation with the movement of said pistons,
- (g) means interconnecting said fluid actuated cylinder and said piston rods in operative relation,
  - (1) said valve member within said sausage inlet manifold adapted to admit sausage material, under pressure, therethrough and through said sausage material inlet ports into said mold cavities to urge said pistons away from said closure members less than the length of the sausage to be molded,
- (h) a further fluid actuated cylinder,
  - (1) means associated with said further fluid actuated cylinder to selectively move said valve member in said manifold to close each said inlet port leading to the respective mold cavities,
  - (2) means associated with said further fluid actuated cylinder to create relative movement between said pistons and said mold cavity closure members to relieve pressure on said sausage,
  - (3) said further fluid actuated cylinder, upon further movement, being adapted to move said pistons in said mold cavities to eject sausage from said mold cavities,
- (i) a cutter blade movable across the face of said pistons to cut the sausage therefrom, and (j) a fluid actuated cylinder associated with said cutter blade to selectively move said blade in timed relation with respect to said pistons ejecting the sausage.

25. A skinless sausage molding machine, as defined in claim 24; wherein
   (a) said manifold is cylindrical and is mounted transversely of said block,
   (b) an arcuately movable valve member mounted in sealing relation with said cylindrical manifold and being adapted to close said inlet ports, when in one position, and to open said inlet ports when in another position.

26. A skinless sausage molding machine as defined in claim 25; wherein
   (a) said arcuately movable valve member is parti-cylindrical and has an elongated slot formed along a side thereof which registers with said inlet openings when in one position and moves out of register with said inlet openings when in another position,
   (b) the portion of said parti-cylindrical valve member adjacent said slot being yieldable, under fluid pressure, to form a wiping, fluid tight seal with the inner cylindrical surface of said manifold upon application of pressure within said valve member.

27. A skinless sausage molding machine, as defined in claim 26; wherein
   (a) said parti-cylindrical valve assembly has a shaft extending from each end thereof,
   (b) a closure member closing each end of said parti-cylindrical valve member, each closure member being secured to the respective shaft,
      (1) a turning vane extending outward from each side of said closure member and engaging said slot so as to form a turning member attachably connected to said parti-cylindrical valve member,
   (c) bearing members within each end of said cylindrical manifold and forming a fluid tight seal therewith and with said shafts, and
   (d) turning means associated with each said shaft for rotating said parti-cylindrical valve member within said cylindrical manifold.

28. A skinless sausage molding machine, as defined in claim 26; wherein
   (a) gear actuated means is associated with said parti-cylindrical valve member to arcuately move said valve member in timed relation with respect to said pistons in said mold cavities.

29. A skinless sausage molding machine as defined in claim 25; wherein
   (a) a sausage inlet manifold mounting block is attachably secured to said block having said mold cavities formed therein, and
   (b) said cylindrical manifold is mounted within said sausage inlet manifold mounting block.

30. A skinless sausage molding machine, as defined in claim 24, wherein
   (a) said fluid actuated cylinder associated with said cutter blade is a double acting fluid cylinder having a longitudinally movable shaft therein,
   (b) said blade being operatively connected to said longitudinally movable shaft, and
   (c) valve means, within a fluid pressure supply line, to admit fluid, under pressure, into said fluid actuated cylinder in timed relation with respect to the movement of said pistons in said mold cavities.

31. A skinless sausage molding machine, which machine comprises;
   (a) a frame,
   (b) a block mounted on said frame,
      (1) said block having a plurality of elongated mold cavities formed therein,
   (c) a manifold mounting block detachably secured to said block having said mold cavities formed therein,
   (d) a manifold on said manifold mounting block, which manifold is mounted transversely of said elongated mold cavities within said block,
   (e) a movable valve member mounted within said manifold to selectively open said inlet ports into said mold cavities when in one position, and to selectively close said inlet ports into said mold cavities when in another position,
   (f) a sausage material inlet into said manifold intermediate the length thereof,
   (g) a sausage material supply pipe connected to said sausage inlet within said sausage inlet manifold,
   (h) each said mold cavity having a sausage inlet port interconnecting each said mold cavity and said manifold,
   (i) a piston mounted in each mold cavity in said block in sealed relation therewith,
   (j) a piston rod connected with each said piston and extending out of each mold cavity at one end thereof,
      (1) a transverse member detachably connecting said piston rods for unitary movement,
   (k) a mold cavity closure member closing the opposite end of each mold cavity,
      (1) sealing means associated with each said closure member to form a fluid tight seal with the respective mold cavities,
   (l) a fluid supply system,
   (m) a first fluid actuated cylinder mounted on said frame and being connected to said fluid supply system,
      (1) a fluid supply timing valve connected with said fluid supply system and being connected in fluid communication with said first fluid actuated cylinder,
      (2) associated means interconnecting said first fluid actuated cylinder and said mold cavity closure members to close said mold cavities upon movement of said associated means in one direction,
      (3) said mold cavity closure members adapted to abut with the adjacent faces of the respective pistons in said mold cavities at atmospheric pressure to move said mold cavity pistons into said mold cavities in abutting, sealed relation,
   (n) a second fluid actuated cylinder,
      (1) a second fluid supply timing valve connected with said fluid supply system and being connected in fluid communication with said fluid actuated cylinder,
   (o) means interconnecting said second fluid actuated cylinder and said transverse member connected to said piston rods in the respective mold cavities,
   (p) means introducing said transverse member and said fluid actuated cylinder to move said piston rods connected thereto and said pistons within said mold cavities out of abutting relation to create a vacuum intermediate the face of the mold cavity closure member and the pistons within the cavities, until the inlet ports connecting said mold cavities with said manifold are opened,
   (q) applying fluid pressure on sausage material within said material supply pipe to move said pistons within said mold cavities a distance less than the length the sausage is to be molded,
      (1) selectively closing said movable valve member within said manifold,
   (r) applying fluid pressure to said first fluid actuated cylinder to move said cavity closure members a predetermined distance forward in said mold cavities containing said sausage under pressure to equalize the pressure therein,
   (s) said first fluid actuated cylinder associated means engaging the transverse member connected to said piston rods to move said piston rods and said sausage in said cavities outward until the faces of said pistons extend out of the outer ends of the mold cavities,
(t) sausage severing means movable across the face of said pistons ejecting said sausage from said mold cavities to sever said sausage from said pistons, and
(u) a fluid actuated cylinder associated with said sausage severing means to move said means to sever the sausage therefrom in timed relation with respect to the movement in said mold cavities.

32. A skinless sausage molding machine as defined in claim 24; wherein
(a) a carriage is movably mounted within said frame,
(b) guide means for guiding said carriage within said frame,
(c) connecting rods connected to said carriage and extending forwardly thereof,
  (1) bearing means associated with said transverse piston rod retainer block to slidably journal said connecting rods therein,
(d) said block having said plurality of interconnecting, elongated mold cavities formed therein having a longitudinal opening, of greater diameter than said connecting rods, formed along each outer side thereof to receive said connecting rods therethrough,
(e) a resilient block detachably secured on the outer ends of said connecting rods and having an angular lip formed on the lower side thereof,
  (1) said resilient block having holes formed therein to receive a portion of said piston closure members therein,
  (2) interstices interconnecting adjacent holes in said resilient block,
(f) a transverse block positioned below said block containing said elongated mold cavities,
  (1) bolt means interconnecting said transverse block and said block containing said mold cavities,
(g) a resilient member associated with said transverse block to permit limited relative lateral movement between said transverse block and said block containing said mold cavities,
  (1) said transverse block having an angular face thereon to complementally engage said angular face on said resilient block mounting said connecting rods to direct sausage on the outer face of said block having said mold cavities formed therein into and through said interstices between said mold cylinders, and
(h) a residue pan on the outer face of said resilient block on said connecting rods to receive excess sausage discharged from said interstices.

33. A skinless sausage molding machine, as defined in claim 32; wherein
(a) said transverse piston rod retainer block has bearings therein to slidably receive said connecting rods therethrough,
(b) a resilient transverse member slidably mounted on said frame intermediate said carriage and said transverse piston rod retainer block to be received in abutting relation between said carriage and said transverse piston rod retainer block, when said carriage is moved forward by said fluid cylinder, and
(c) a rod interconnecting said resilient member and said movable valve member in loose linkage relation to actuate said movable valve member in timed relation with the movement of said carriage and said sausage ejection pistons.

34. A skinless sausage molding machine, as defined in claim 31; wherein
(a) said fluid supply system is an air system, and
(b) a manifold and muffler, having an air outlet pipe, associated with a discharge line leading from said timing valve.

References Cited
UNITED STATES PATENTS

| | | | |
|---|---|---|---|
| 994,714 | 6/1911 | Boyle | 17—32 |
| 2,683,284 | 7/1954 | Anderson | 17—32 |
| 3,132,950 | 5/1964 | Macy et al. | 99—109 |
| 3,242,571 | 3/1966 | Langford | 31—44 |
| 3,287,761 | 11/1966 | Borsuk et al. | 17—32 |

LUCIE LAUDENSLAGER, *Primary Examiner.*

U.S. Cl. X.R.
99—109; 17—45